(12) United States Patent
Sambonsugi

(10) Patent No.: US 9,794,504 B2
(45) Date of Patent: Oct. 17, 2017

(54) IMAGE CAPTURING APPARATUS WITH AN IMAGE SENSOR COMPRISING ONE OR MORE SEMICONDUCTOR SUBSTRATES AND CONTROL METHOD THEREOF

(71) Applicant: CANON KABUSHIKI KAISHA, Tokyo (JP)

(72) Inventor: Hideaki Sambonsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/066,660

(22) Filed: Mar. 10, 2016

(65) Prior Publication Data

US 2016/0198111 A1 Jul. 7, 2016

Related U.S. Application Data

(63) Continuation of application No. 14/507,460, filed on Oct. 6, 2014, now Pat. No. 9,319,584.

(30) Foreign Application Priority Data

Oct. 8, 2013 (JP) .................................. 2013-211429

(51) Int. Cl.
| | |
|---|---|
| *H04N 5/232* | (2006.01) |
| *H04N 5/372* | (2011.01) |
| *H04N 5/378* | (2011.01) |

(52) U.S. Cl.
CPC ......... *H04N 5/378* (2013.01); *H04N 5/23245* (2013.01); *H04N 5/372* (2013.01)

(58) Field of Classification Search
CPC .................................................... H04N 5/374
(Continued)

(56) References Cited

U.S. PATENT DOCUMENTS

| 2006/0023109 A1* | 2/2006 | Mabuchi | ................. H01L 24/17 |
| | | | 348/340 |
| 2011/0254988 A1* | 10/2011 | Itakura | .............. H01L 27/14634 |
| | | | 348/308 |
| 2013/0229560 A1* | 9/2013 | Kondo | ................... H04N 5/374 |
| | | | 348/308 |

FOREIGN PATENT DOCUMENTS

| CN | 100502024 C | 6/2009 |
| CN | 102984457 A | 3/2013 |

(Continued)

OTHER PUBLICATIONS

The above foreign patent documents were cited in the May 10, 2016 Korean Office Action, which is enclosed without an English Translation, that issued in Korean Patent Application No. 10-2014-0129945.

(Continued)

*Primary Examiner* — Joel Fosselman
(74) *Attorney, Agent, or Firm* — Cowan, Liebowitz & Latman, P.C.

(57) ABSTRACT

An image capturing apparatus comprises an image sensor including a first semiconductor substrate on which a photodiode is arranged, a second semiconductor substrate on which a storage element is arranged, and a connection unit configured to electrically connect the photodiode and the storage element, a first transfer unit configured to transfer pixel signals of a first pixel group to the storage element, a first readout unit configured to read out the pixel signals of the first pixel group, a second transfer unit configured to transfer pixel signals of a second pixel group to the storage element, and a second readout unit configured to read out some of the pixel signals of the second pixel group, wherein an image of one frame is generated by composing the pixel signals of the second pixel group and the first pixel group.

15 Claims, 21 Drawing Sheets

(58) Field of Classification Search
USPC .................................................. 348/308, 296
See application file for complete search history.

(56) References Cited

FOREIGN PATENT DOCUMENTS

| | | |
|---|---|---|
| JP | 2010-283787 A | 12/2010 |
| JP | 2011-217315 A | 10/2011 |
| JP | 2013-051674 A | 3/2013 |
| JP | 05224925 B2 | 7/2013 |
| KR | 10-2008-0106668 A | 12/2008 |

OTHER PUBLICATIONS

The above foreign patent documents were cited in a Mar. 20, 2017 Chinese Office Action, which is enclosed with an English Translation, that issued in Chinese Patent Application No. 201410514433.9.

\* cited by examiner

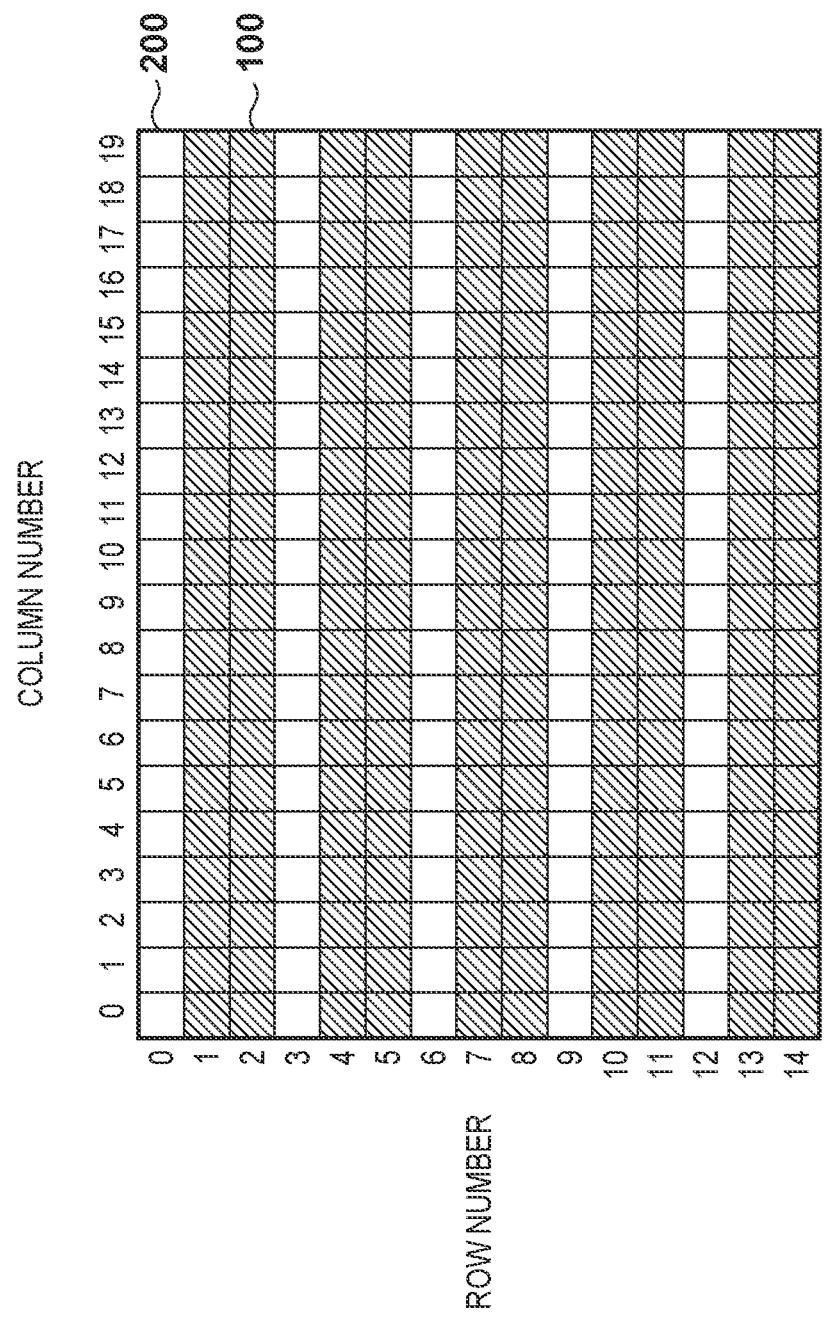

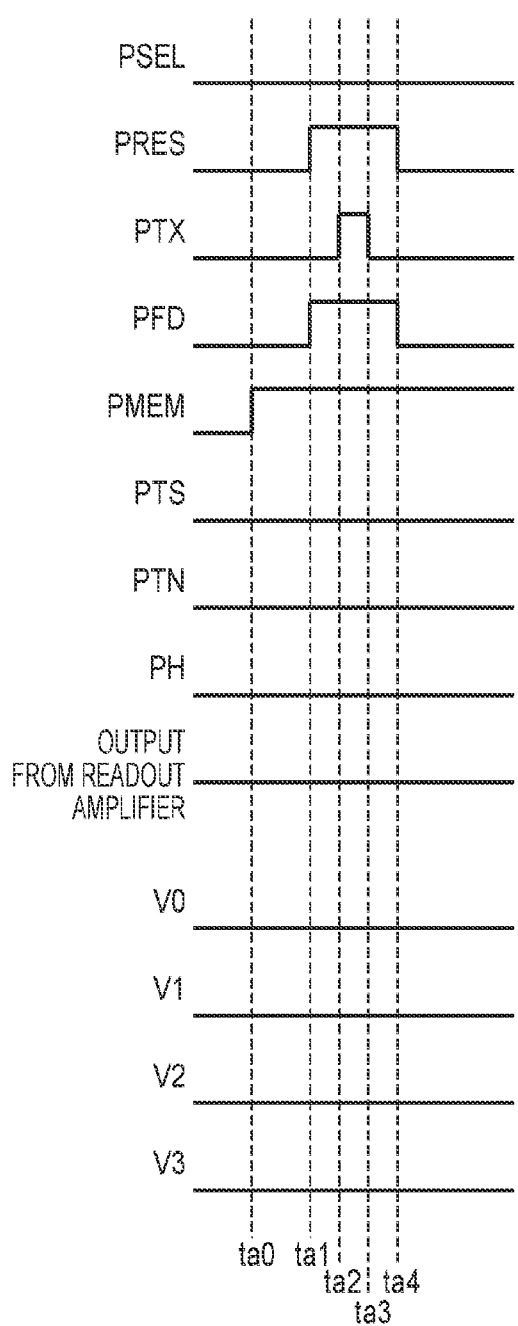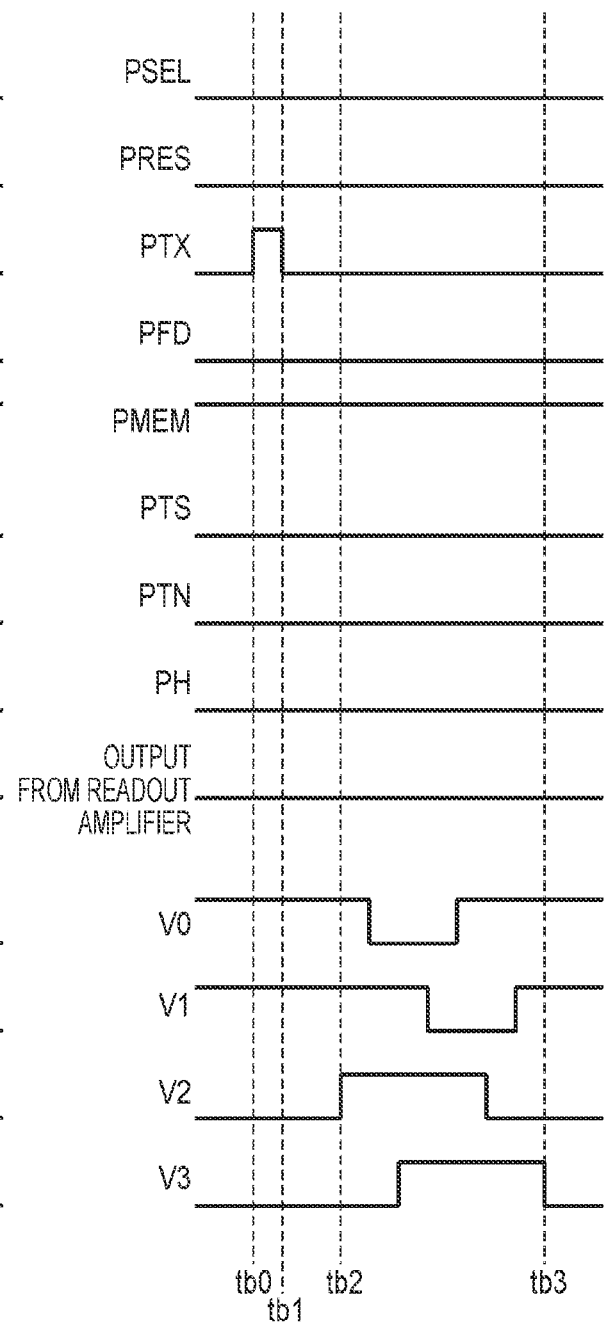

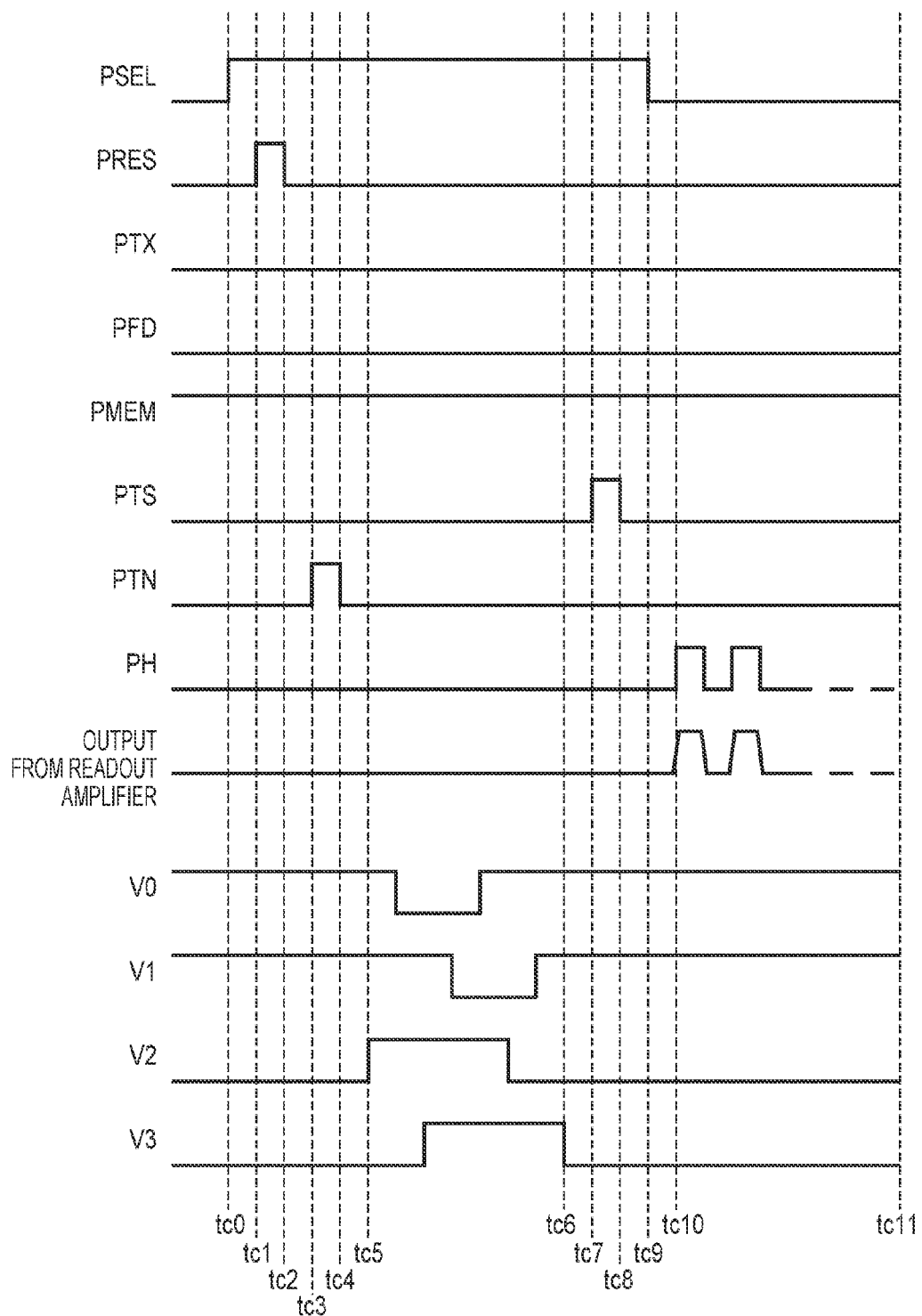

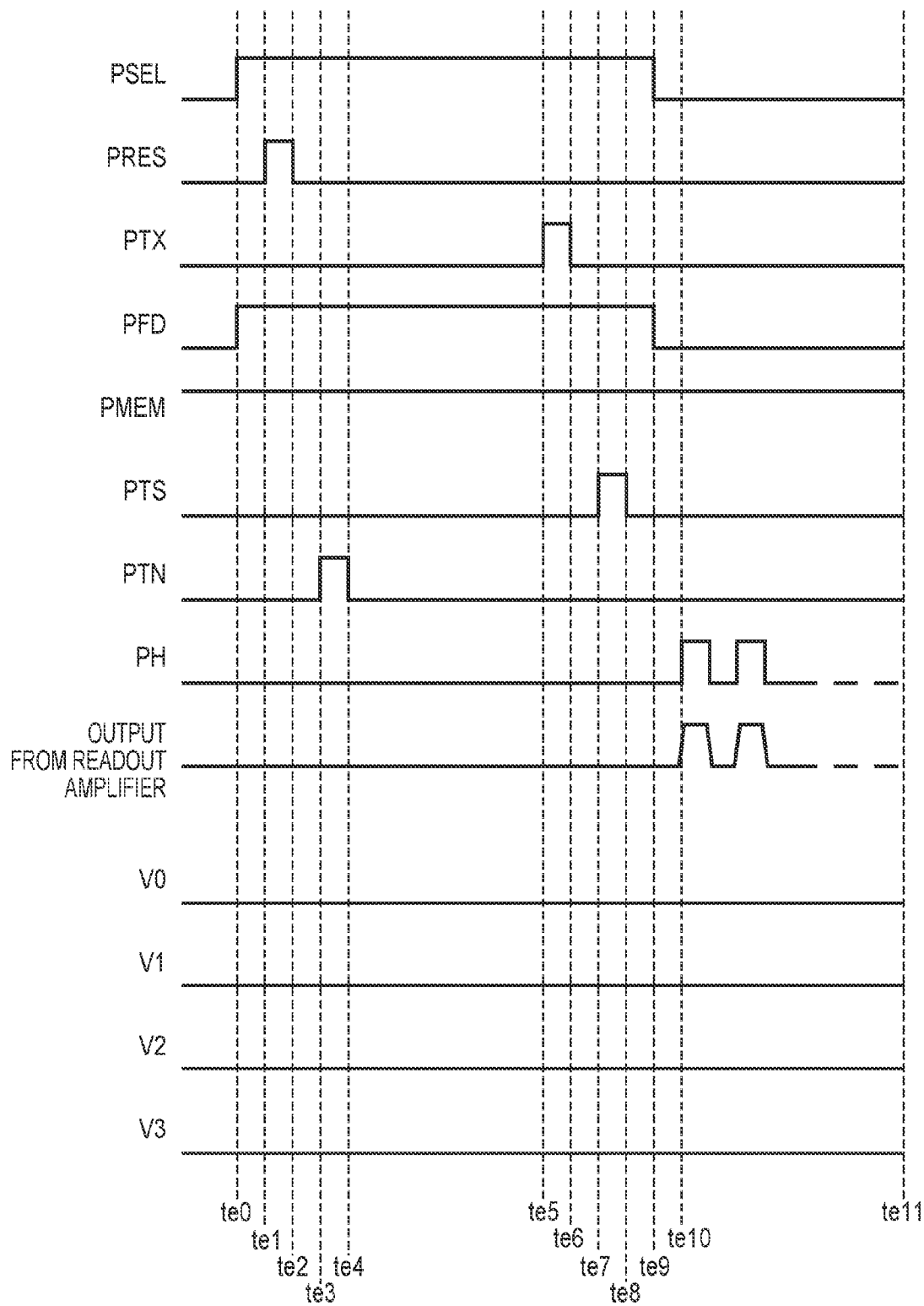

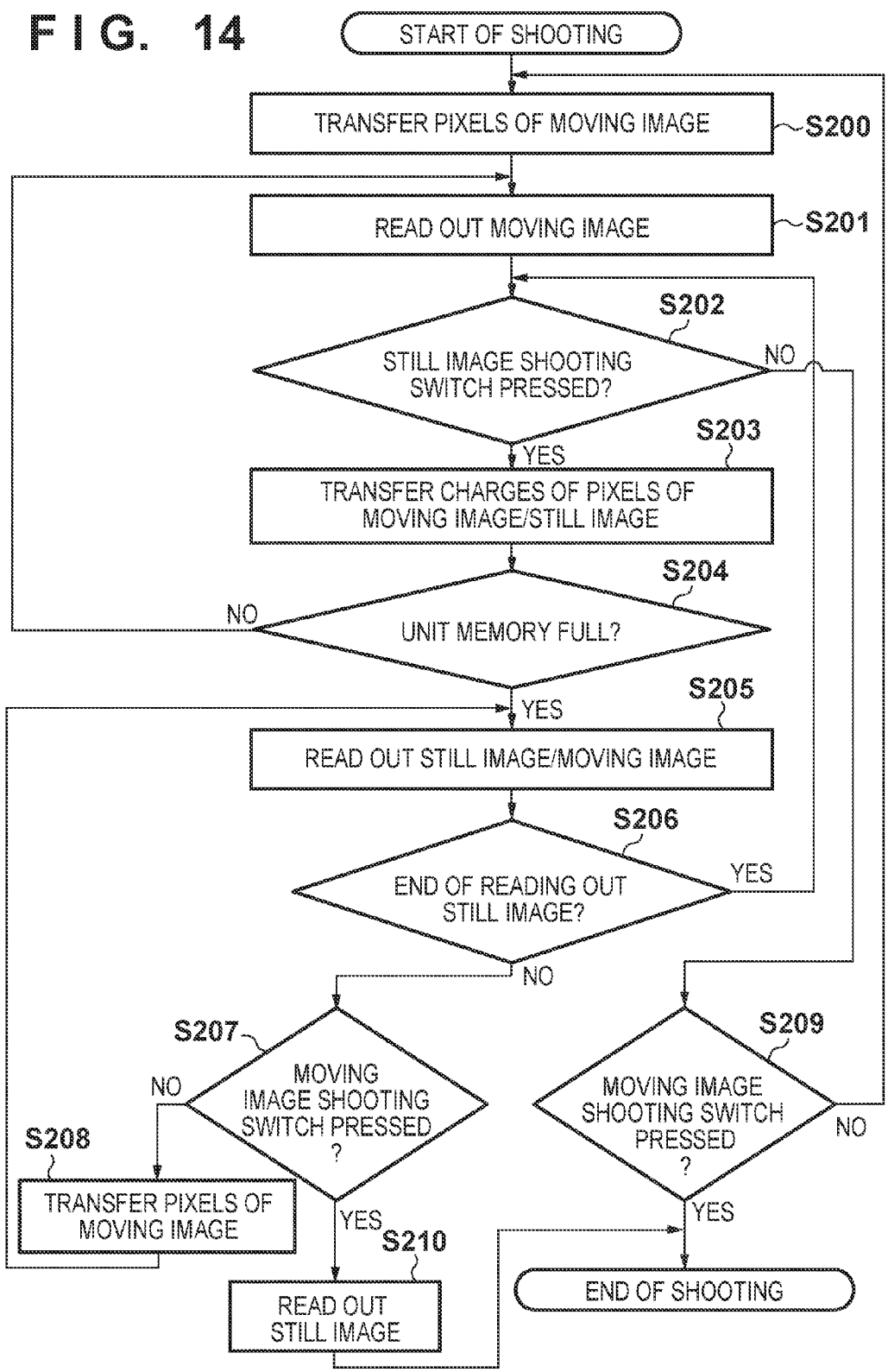

IMAGE CAPTURING APPARATUS WITH AN IMAGE SENSOR COMPRISING ONE OR MORE SEMICONDUCTOR SUBSTRATES AND CONTROL METHOD THEREOF

CROSS-REFERENCE TO RELATED APPLICATION

This application is a continuation of application Ser. No. 14/507,460, filed Oct. 6, 2014, the entire disclosure of which is hereby incorporated by reference.

BACKGROUND OF THE INVENTION

Field of the Invention

The present invention relates to an image capturing apparatus and a control method thereof.

Description of the Related Art

There is a technique in which each pixel includes a storage element, and an image is shot at a high frame rate by sequentially storing, in the storage element, image signals obtained by continuous accumulation, without externally reading them out from an image sensor.

Japanese Patent Laid-Open No. 2001-345441 has disclosed a technique in which each pixel includes a charge signal accumulation unit constituted by a charge-coupled device, and an image is shot at a high frame rate by moving charges obtained by accumulation between charge-coupled devices, sequentially storing them, and reading them out.

However, in the related art disclosed in Japanese Patent Laid-Open No. 2001-345441 described above, charges generated by photoelectrical conversion upon exposure are sequentially stored, so images of different types such as a still image and moving image cannot be shot simultaneously. Since each pixel includes a storage element, the pixel area increases, the number of pixels which can be arranged in the limited area decreases, and the image quality degrades. If each pixel includes many storage elements, the photodiode area decreases, the saturation characteristic and the like deteriorate, and the image quality degrades.

SUMMARY OF THE INVENTION

The present invention has been made to solve the above-described problems, and provides an image capturing apparatus capable of simultaneously shooting a still image and moving image while maintaining the image quality.

According to the first aspect of the present invention, there is provided an image capturing apparatus comprising: an image sensor including a first semiconductor substrate on which a plurality of photodiodes are arranged, a second semiconductor substrate on which a plurality of storage elements configured to store pixel signals generated by the plurality of photodiodes are arranged, and a plurality of connection units configured to electrically connect the plurality of photodiodes and the plurality of storage elements; a first transfer unit configured to transfer, to the storage elements, pixel signals of a first pixel group that have been accumulated in every predetermined frame; a first readout unit configured to read out, for every frame, the pixel signals of the first pixel group that have been stored in the storage elements; a second transfer unit configured to transfer, to the storage elements, pixel signals of a second pixel group different from the first pixel group that have been accumulated at a predetermined timing; and a second readout unit configured to read out some of the pixel signals of the second pixel group that have been stored in the storage elements, wherein an image of one frame is generated by composing the pixel signals of the second pixel group that have been read out through a plurality of frame periods, and the pixel signals of the first pixel group that have been accumulated simultaneously with the pixel signals of the second pixel group.

According to the second aspect of the present invention, there is provided a method of controlling an image capturing apparatus including an image sensor including a first semiconductor substrate on which a plurality of photodiodes are arranged, a second semiconductor substrate on which a plurality of storage elements configured to store pixel signals generated by the plurality of photodiodes are arranged, and a plurality of connection units configured to electrically connect the plurality of photodiodes and the plurality of storage elements, the method comprising: a first transfer step of transferring, to the storage elements, pixel signals of a first pixel group that have been accumulated in every predetermined frame; a first readout step of reading out, for every frame, the pixel signals of the first pixel group that have been stored in the storage elements; a second transfer step of transferring, to the storage elements, pixel signals of a second pixel group different from the first pixel group that have been accumulated at a predetermined timing; and a second readout step of reading out some of the pixel signals of the second pixel group that have been stored in the storage elements, wherein an image of one frame is generated by composing the pixel signals of the second pixel group that have been read out through a plurality of frame periods, and the pixel signals of the first pixel group that have been accumulated simultaneously with the pixel signals of the second pixel group.

Further features of the present invention will become apparent from the following description of exemplary embodiments with reference to the attached drawings.

BRIEF DESCRIPTION OF THE DRAWINGS

FIG. 5 is a view showing readout rows in the image sensor;

FIG. 9A is a timing chart showing an operation of the image sensor according to the first embodiment of the present invention;

FIG. 9B is a timing chart showing an operation of the image sensor according to the first embodiment of the present invention;

FIG. 9C is a timing chart showing an operation of the image sensor according to the first embodiment of the present invention;

FIG. 11B is a timing chart showing an operation of the image sensor according to the first embodiment of the present invention;

FIG. 14 is a flowchart showing the operation of an image capturing apparatus according to the second embodiment of the present invention;

DESCRIPTION OF THE EMBODIMENTS

Embodiments of the present invention will now be described in detail with reference to the accompanying drawings.

First Embodiment

Figure 1:
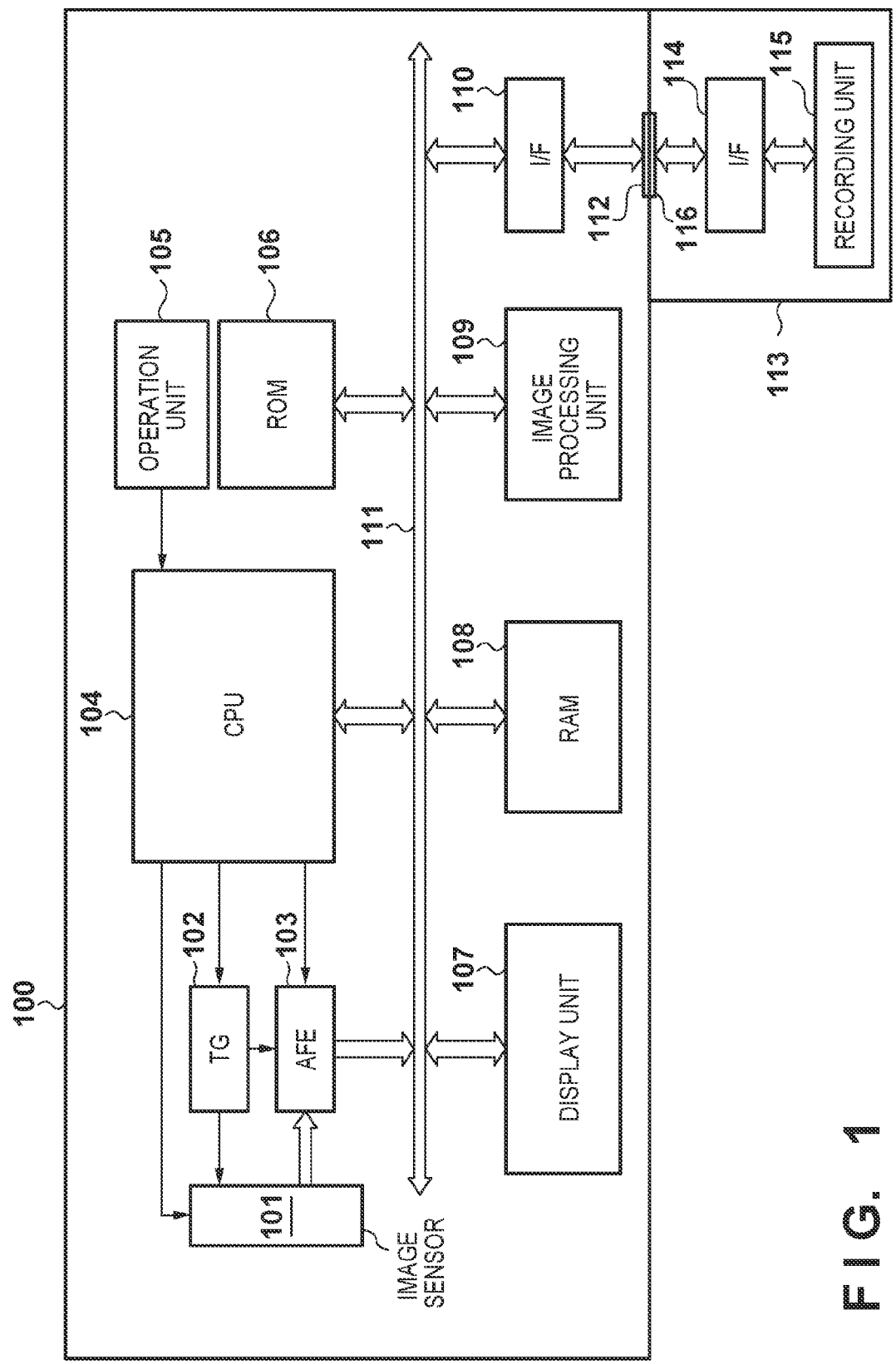
FIG. 1 is a block diagram showing the arrangement of an image capturing apparatus according to the first embodiment of the present invention.

FIG. 1 is a block diagram showing the arrangement of an image capturing apparatus according to the first embodiment of the present invention. In an image capturing apparatus 100 shown in FIG. 1, an image sensor 101 converts a received optical image into an electrical signal (an analog signal, that is, an image signal). In correspondence with gain adjustment and a predetermined quantization bit, an analog front end (to be referred to as an AFE hereinafter) 103 digitizes the analog image signal output from the image sensor 101. A timing generator (to be referred to as a TG hereinafter) 102 controls the driving timings of the image sensor 101 and AFE 103.

A RAM 108 has both the function of an image data storage unit for storing image data digitized by the AFE 103, and image data processed by an image processing unit 109 (to be described later), and the function of a work memory used when a CPU 104 (to be described later) performs an operation. Although these functions are implemented using the RAM 108 in the first embodiment, a memory of another type is also applicable as long as the memory has satisfactory access speed.

A ROM 106 stores a program used when the CPU 104 (to be described later) performs an operation. Although the ROM 106 is a flash ROM in the first embodiment, this is merely an example, and a memory of another type is also applicable as long as the memory has satisfactory access speed.

The CPU 104 performs centralized control of the image capturing apparatus 100. The image processing unit 109 performs processes such as composition, correction, and compression on a shot image. A connector 112 is connected to a connector 116 of an external recording medium 113 such as a nonvolatile memory or hard disk. An interface unit 110 communicates with an interface 114 of the connected external recording medium 113, and records still image data and moving image data in a recording unit 115 of the external recording medium 113. Although a detachable external recording medium is applied as the recording medium in the first embodiment, another form in which a data writable nonvolatile memory, hard disk, or the like is incorporated is also possible.

An operation unit 105 performs, for the CPU 104, an operation to a still image/moving image shooting switch by the user, or a setting operation for shooting conditions and the like. A display unit 107 displays a shot still image, moving image, menu, and the like.

Figure 2:
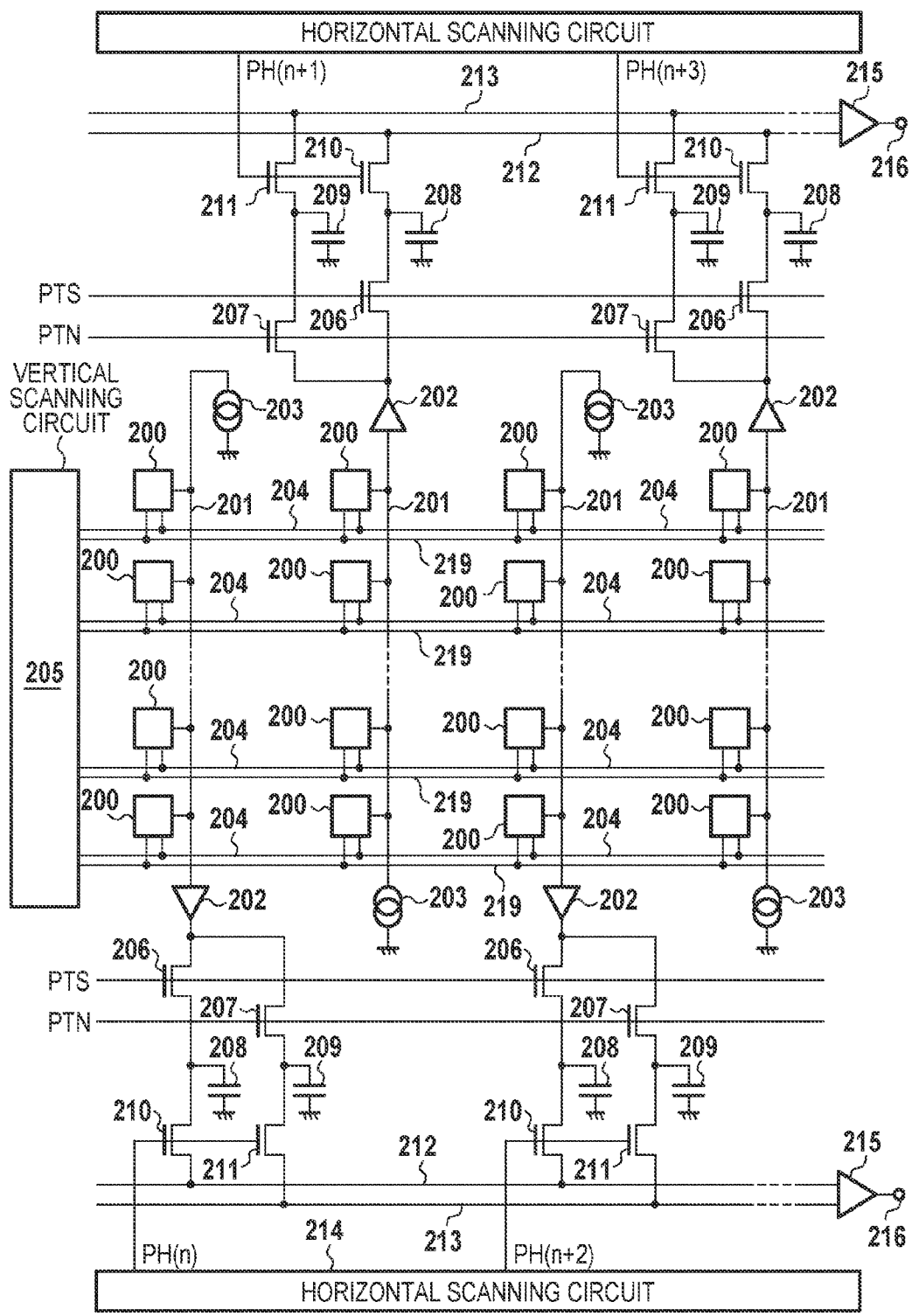
FIG. 2 is a circuit diagram showing the arrangement of an image sensor according to the first embodiment of the present invention.

Next, the arrangement of the image sensor 101 will be explained with reference to FIG. 2. In FIG. 2, the effective pixel region of the image sensor is formed by arraying, in the horizontal direction (row direction), a plurality of pixel sets 200 arranged in the vertical direction (column direction). Each pixel set 200 is connected to a corresponding control signal line 204 to which a vertical scanning circuit 205 outputs various control signals (to be described later). The pixel set 200 is connected to a corresponding driving voltage line 219 to which the vertical scanning circuit 205 outputs a driving voltage (to be described later). Further, the pixel set 200 is connected to a corresponding vertical output line 201 which longitudinally runs inside the image sensor and is adjacent to a pixel column. Each vertical output line 201 has one end connected to a corresponding constant current source 203, and the other end connected to a corresponding column amplifier (amplification amplifier) 202. The output of each column amplifier 202 is connected to a corresponding holding capacitor 208 via a corresponding switch 206 which is driven by a control signal PTS. Each holding capacitor 208 is connected to a horizontal output line 212 via an output transfer switch 210 which is driven by a control signal PH output from a horizontal scanning circuit 214 for each column. The output of each column amplifier 202 is connected to a corresponding holding capacitor 209 via a corresponding switch 207 which is driven by a control signal PTN. Each holding capacitor 209 is connected to a horizontal output line 213 via an output transfer switch 211 which is driven by the control signal PH output from the horizontal scanning circuit 214 for each column. A readout amplifier 215 is connected to the horizontal output lines 212 and 213, and outputs a pixel signal obtained by multiplying, by a predetermined gain, a difference output between the horizontal output lines 212 and 213.

Figure 3:
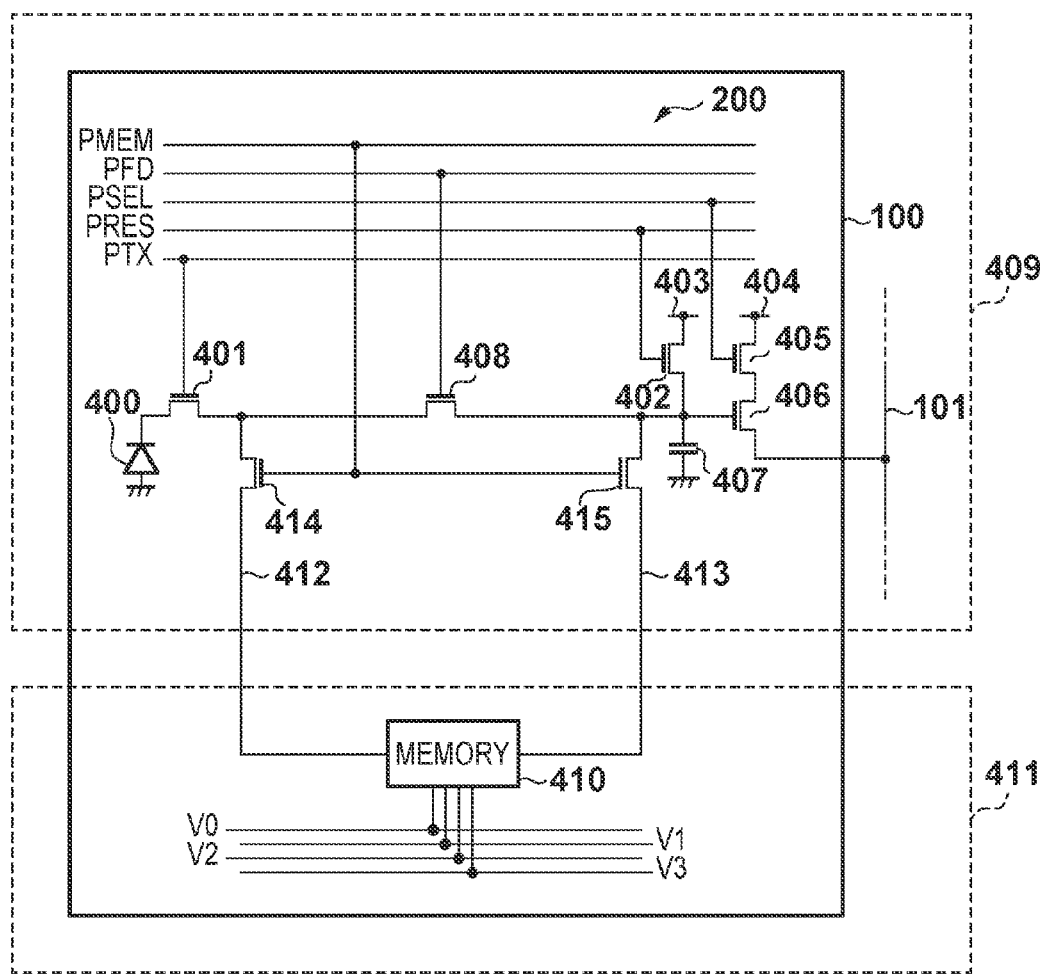
FIG. 3 is a circuit diagram showing the arrangement of a pixel set according to the first embodiment of the present invention.

Next, the pixel set 200 shown in FIG. 3 will be explained. The gate of a transfer switch 401 in the pixel set 200 receives a control signal PTX. The transfer switch 401 is connected to a photodiode 400, and an FD (Floating Diffusion) 407 via a connection switch 408. The connection switch 408 receives a control signal PFD. The gate of a reset switch 402 receives a control signal PRES, and the gate of a row selection switch 405 receives a control signal PSEL. A pixel amplifier 406 is connected to the FD 407. Each of the control signals PTX, PFD, PRES, PSEL, and PMEM is equivalent to a control signal to be output to the control signal line 204 in FIG. 2, and is controlled for each row.

A memory 410 temporarily stores charges accumulated in the photodiode 400. The memory 410 has one end connected to the transfer switch 401 via a connection line 412 and switch 414, and the other end connected to the FD 407 via a connection line 413 and switch 415. The memory 410 is constituted by a charge-coupled device, and driving voltages V0, V1, V2, and V3 output to the driving voltage line 219 in FIG. 2 for each row are applied to the memory 410. Note that the memory 410 serving as a storage element is constituted by a charge-coupled device, but is not limited to this. Any element which holds charges, such as a capacitor, is applicable as the storage element.

Figure 4:
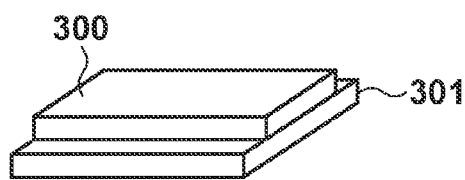
FIG. 4 is a view showing the arrangement of the image sensor.

As shown in FIG. 4, the image sensor is constituted by stacking and joining substrates 300 and 301 serving as two semiconductor substrates. Circuit elements within a broken line 409 in FIG. 3 are formed on the substrate 300. Circuit elements other than the pixel set 200 shown in FIG. 2 are similarly formed on the substrate 300. To the contrary, the memory 410 within a broken line 411, and a driving circuit (not shown) for the driving voltages V0, V1, V2, and V3 are formed on the substrate 301. The connection lines 412 and 413 are formed from microbumps or the like, and the substrates 300 and 301 are electrically connected for each pixel. With this arrangement, even when the area of the memory 410 is large, the area of the photodiode 400 need not be decreased, and the image quality including the saturation characteristic and resolution can be maintained.

The image capturing apparatus 100 according to the first embodiment can perform still image shooting and moving image shooting. For example, the image sensor 101 is constituted by arraying the pixel sets 200 by 20 pixels in the horizontal direction and 15 pixels in the vertical direction, as shown in FIG. 5. When still image shooting is performed, the image signals of all the pixel sets shown in FIG. 5 are read out to generate a still image. When moving image shooting is performed, the image signals of pixel sets on rows indicated by row numbers 0, 3, 6, 9, and 12 are read out for every frame (thinning readout) to generate a moving image. That is, the image signals of the pixel sets 200 hatched in FIG. 5 are not read out for a moving image. The rows of row numbers 0, 3, 6, 9, and 12 shown in FIG. 5 will be called first rows (first pixel group). The rows hatched in FIG. 5 which are thinned out and are not read out for a moving image will be called second rows (second pixel group). Note that the array of the pixel sets 200, and pixel sets serving as readout targets for a still image or moving image are not limited to this arrangement.

Figure 6A:
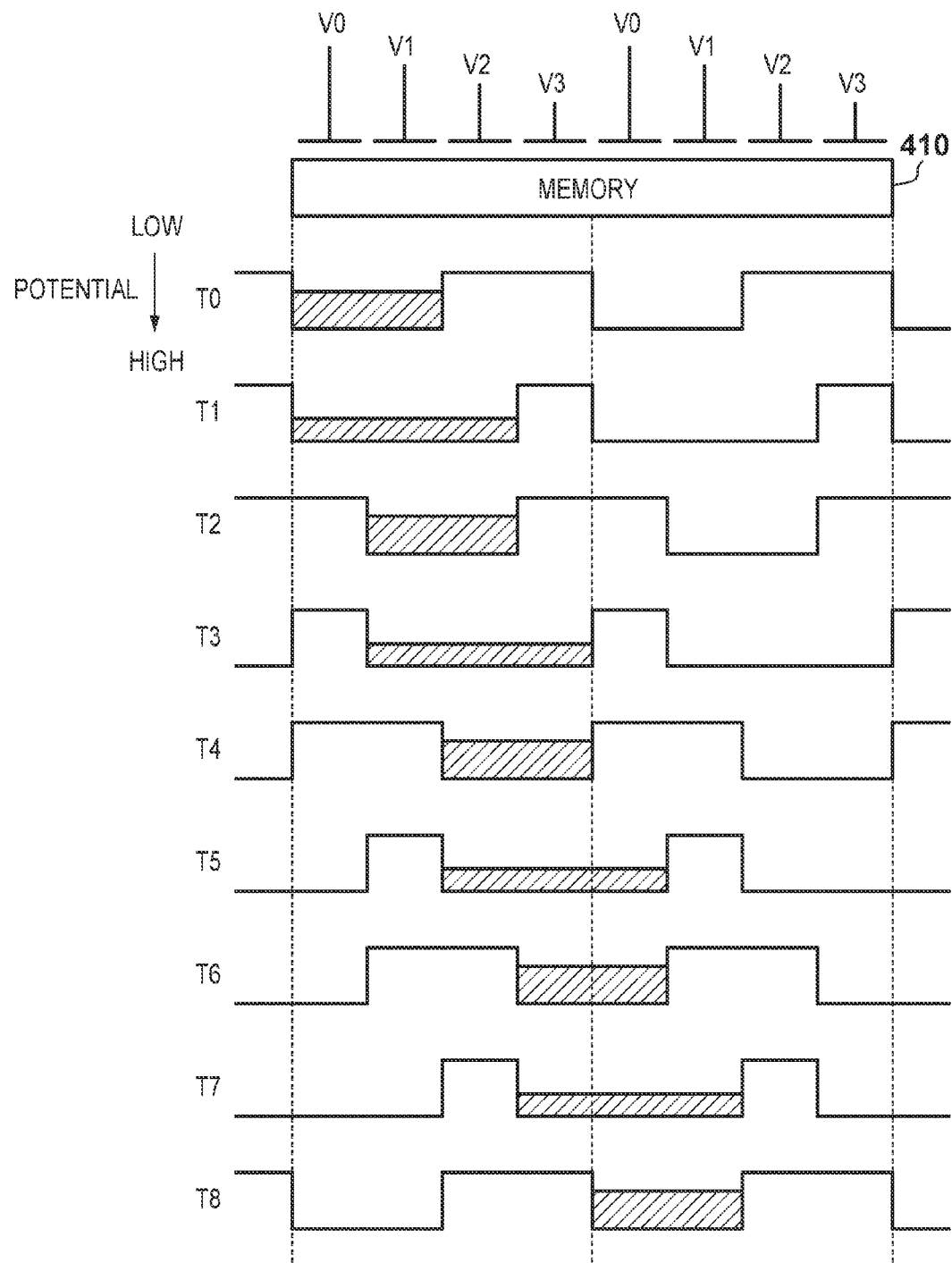
FIG. 6A is a timing chart showing an operation of the image sensor according to the first embodiment of the present invention.
Figure 6B:
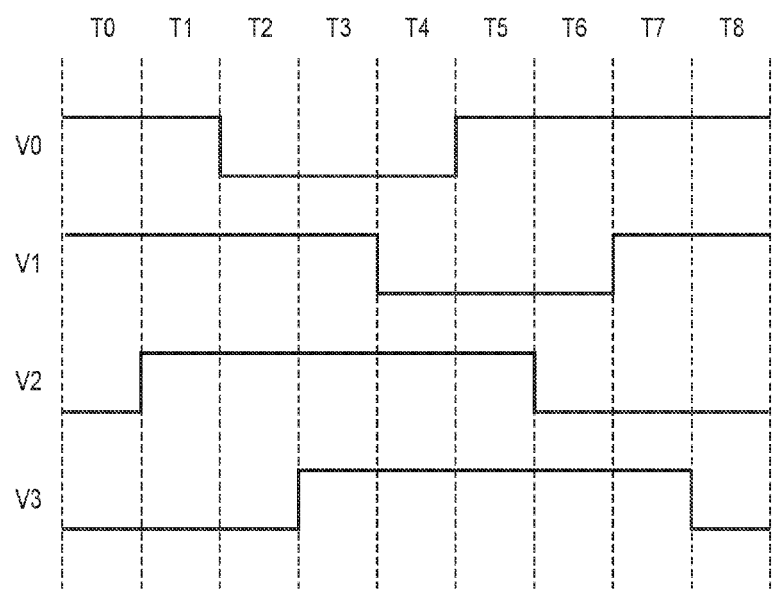
FIG. 6B is a timing chart showing an operation of the image sensor according to the first embodiment of the present invention.

Next, the movement of charges in the memory 410 will be explained with reference to FIGS. 6A and 6B. As shown in FIG. 6A, the driving voltages V0, V1, V2, and V3 are applied to the memory 410. At time T0, the driving voltages V0 and V1 are applied. The potential drops at portions at which the voltages V0 and V1 are applied, and charges are stored there. At time T1, the voltage V2 is applied, and charges spread to a range in which the voltages V0 to V2 are applied. At time T2, the application of the voltage V0 is stopped, and the charges are stored at portions at which the voltages V1 and V2 are applied. As a result, the charges move by one electrode. When the same operation is continued from time T3 to time T8, the charges move inside the memory, as shown in FIG. 6B. The operations at time T0 to time T8 are performed to store, in the memory 410, charges accumulated in the photodiode 400, or read out charges from the memory 410.

Figure 7:
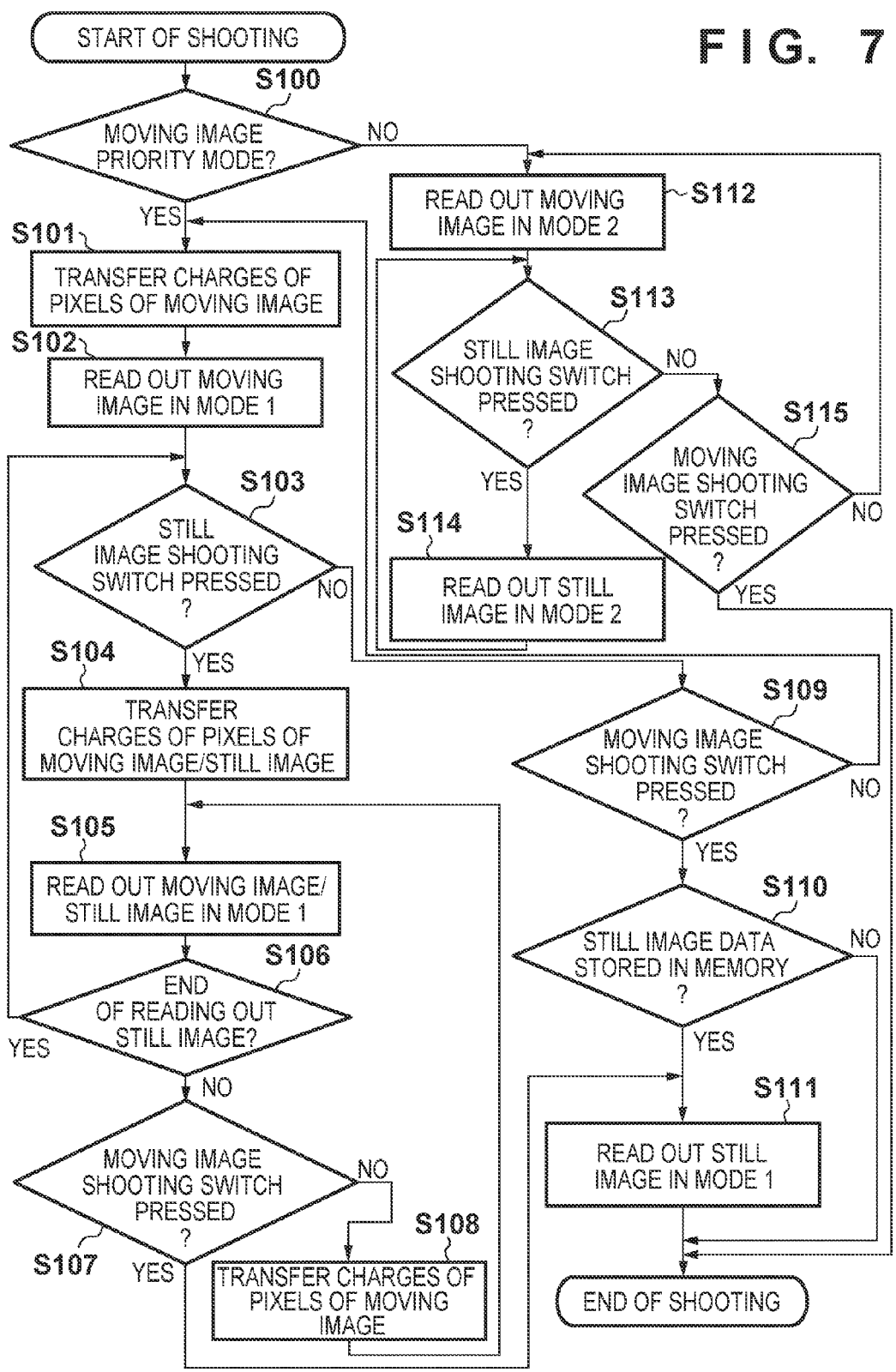
FIG. 7 is a flowchart showing the operation of the image capturing apparatus according to the first embodiment of the present invention.

Next, the operation of the image capturing apparatus according to the first embodiment will be explained. FIG. 7 is a flowchart showing the operation of the image capturing apparatus 100 according to the first embodiment.

First, when a moving image shooting switch included in the operation unit 105 is pressed, moving image shooting starts, and the process advances to step S100. The image capturing apparatus 100 according to the first embodiment has a moving image priority mode and still image priority mode. In the moving image priority mode, when a still image shooting switch is pressed during moving image shooting, still image shooting is performed at the same time as moving image shooting without interrupting moving image shooting. In the still image priority mode, when the still image shooting switch is pressed during moving image shooting, moving image shooting is interrupted, and still image shooting is performed. In step S100, the CPU 104 determines a mode which has been selected in advance by the user using the operation unit 105 and display unit 107. If the moving image priority mode has been selected, the process advances to step S101.

Figure 8:
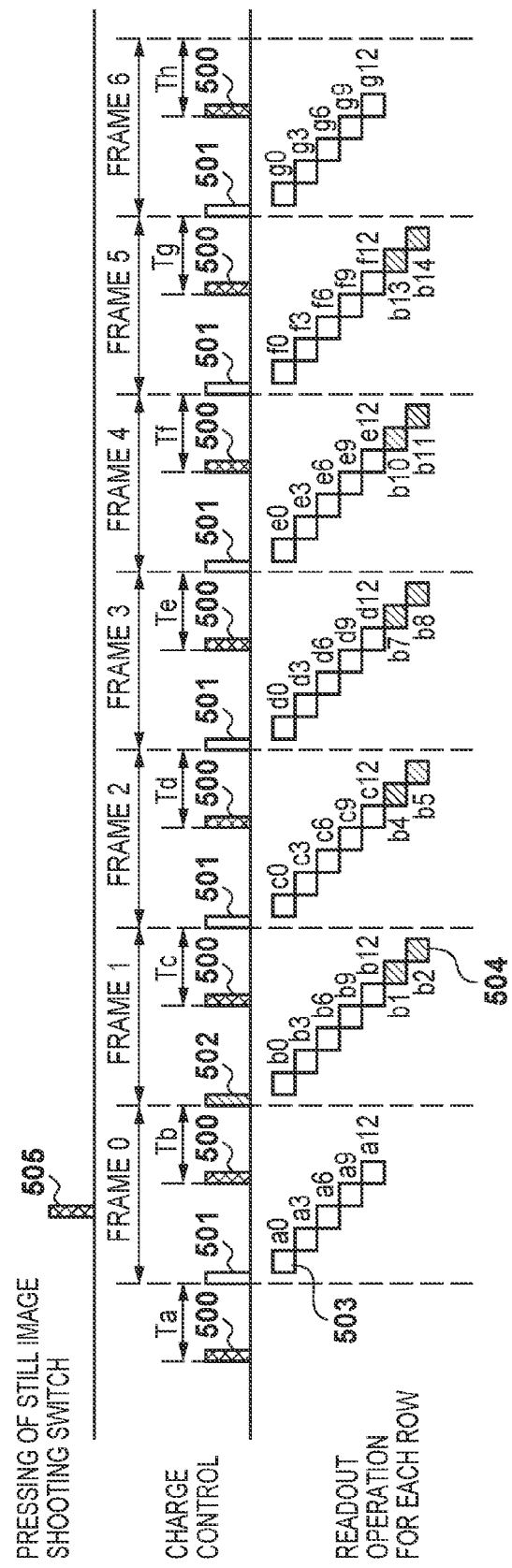
FIG. 8 is a view showing an operation of the image sensor according to the first embodiment of the present invention.

In step S101, charges accumulated in the photodiodes 400 of the pixel sets 200 to be used for a moving image are transferred to the memories 410. FIG. 8 is a view showing accumulation of charges, transfer to the memory, and readout of charges (image signals). In a reset operation 500, the photodiodes 400 of all the pixel sets 200 are reset. FIG. 9A shows a reset operation. First, at time ta0, the control signal PMEM becomes active for all rows to turn on the switches 414 and 415, and connect the memories 410 to the transfer switches 401 and FDs 407. Then, at time ta1, the control signals PRES and PFD become active for all rows to turn on the reset switches 402 and connection switches 408 of all the pixel sets 200, and reset the gates of the pixel amplifiers 406, that is, the FDs 407. In the period between time ta2 and time ta3, the control signal PTX becomes active for all rows. Although only the control signals for a specific row are shown here, the control signal PTX becomes active for all rows in this period, and the charges of the photodiodes 400 of all the pixel sets are transferred to the gates of the pixel amplifiers 406 via the transfer switches 401 and connection switches 408. As a result, the photodiodes 400 are reset. When the control signal PTX is negated at time ta3, accumulation starts. At time ta3, the control signal PRES is negated for all rows.

In a transfer operation 501, charges are transferred from the photodiodes 400 to the memories 410 on the first rows. FIG. 9B shows a charge transfer operation. In the period between time tb0 and time tb1, the control signal PTX becomes active for the first rows to turn on the transfer switches 401, and transfer charges accumulated in the photodiodes 400 to the memories 410. The accumulation is completed by this operation, and a period Ta shown in FIG. 8 serves as the accumulation period. In the period between time tb2 and time tb3, the driving voltages V0, V1, V2, and V3 for the first rows are applied at the timings of the periods T0 to T8 shown in FIG. 6B. Accordingly, the charges are stored in the memories 410. By these operations, charges simultaneously generated by exposure are stored in the memories 410 of respective pixels on the first rows.

After that, in step S102, the image signals of a moving image that have been stored in the memories 410 are read out. In a readout operation 503 for each row shown in FIG.

8, a0 represents readout of charges (image signals) accumulated in the accumulation period Ta from the row of row number 0. Charges (image signals) accumulated in the accumulation period Ta on the rows of row numbers 0, 3, 6, 9, and 12 are sequentially read out.

FIG. 9C shows a readout operation for one row. Note that the readout in FIG. 9C is defined as readout in mode 1. At time tc0, the control signal PSEL becomes active for a readout target row to turn on the row selection switches 405. Each source follower circuit constituted by the pixel amplifier 406 and the current source 203 connected to the vertical output line 201 changes to the operating state. At time tc1, the control signal PRES becomes active to turn on the reset switches 402 and initialize the gates of the pixel amplifiers 406, that is, the FDs 407. That is, signals of a signal level (so-called dark level) immediately after the reset are output to the vertical output lines 201. The control signal PRES is negated at time tc2, and the control signal PTN becomes active at time tc3. In response to this, the switches 207 connected to the outputs of the column amplifiers 202 connected to the vertical output lines 201 are turned on to hold dark-level outputs in the holding capacitors 209.

Upon completion of the transfer operation at time tc4, the driving voltages V0, V1, V2, and V3 for the readout target row are applied at the timings indicated by T0 to T8 in FIG. 6B in the period between time tc5 and time tc6. Then, the charges stored in the memories 410 are transferred to the FDs 407 serving as the gates of the pixel amplifiers 406. At this time, the potential varies from the reset level by the amount of signal charges transferred to the source followers constituted by the pixel amplifiers 406, and then the signal level is finalized. At time tc7, the control signal PTS becomes active. In response to this, the switches 206 connected to the outputs of the column amplifiers 202 connected to the vertical output lines 201 are turned on, and the holding capacitors 208 hold the signal level. At time tc8, the control signal PTS is negated, completing the transfer operation.

By these operations, the holding capacitors 208 and 209 hold the signal level and dark level of the pixel sets 200 arranged on the readout target row, respectively. Since the signals have been output from the pixels, the control signal PSEL is negated at time tc9.

At time tc10, the horizontal scanning circuit 214 outputs the control signal PH to perform an operation of controlling the transfer switches 210 and 211, and connecting the holding capacitors 208 and 209 to the horizontal output lines 212 and 213. The control signal PH(n) becomes active to connect the holding capacitors 208 and 209 on the nth column to the horizontal output lines 212 and 213 via the transfer switches 210 and 211, respectively. That is, a signal accumulated in a pixel positioned on the readout target row and on the nth column is read out to the input of the readout amplifier 215.

Thereafter, all the image signals of respective columns such as the (n+1)th column and (n+2)th column are read out. In this fashion, readout of one row is performed by the operation in the period between time tc10 and time tc11. In the period of frame 0 in FIG. 8, the charges of the first row that have been accumulated in the accumulation period Ta are sequentially read out as image signals. The readout image signals of a moving image of one frame are transferred to the image processing unit 109, undergo image correction processing, compression, and the like, and are recorded on the external recording medium 113 as a moving image together with images of subsequent frames.

Upon completion of readout of one frame, the process advances to step S103. In step S103, it is determined whether the still image shooting switch has been pressed. A flag 505 shown in FIG. 8 represents that the still image shooting switch has been pressed. If the still image shooting switch has been pressed, the process advances to step S104.

In step S104, charges accumulated in the photodiodes 400 of all the pixel sets 200 by exposure control are transferred to the memories 410. By performing the operation shown in FIG. 9B for all rows, the charges of the photodiodes 400 of all the pixel sets 200 that have been accumulated in an accumulation period Tb in FIG. 8 are transferred to the memories 410. The process then advances to step S105.

In step S105, the image signals of all the first rows and some second rows are read out, as represented by frame 1 in FIG. 8. Similarly to step S102, the charges of the first rows that have been accumulated in the accumulation period Tb are sequentially read out. Subsequently, charges accumulated in the accumulation period Tb by the operation shown in FIG. 9C are read out for rows of row numbers 1 and 2 among the second rows. The readout image signals are used to generate a moving image, and are stored in the RAM 108. After that, the process advances to step S106.

In step S106, the CPU 104 determines whether all rows used for a still image have been read out. Since charges accumulated in the accumulation period Tb have been read out from only the 0th, 1st, 2nd, 3rd, 6th, 9th, and 12th rows among rows used for a still image, all image signals necessary for a still image have not been obtained yet. Therefore, the process advances to step S107.

In step S107, it is determined whether the moving image shooting switch has been pressed. If the moving image shooting switch has not been pressed, the process advances to step S108.

In step S108, similarly to the operation in step S102, charges are transferred from the photodiodes 400 to the memories 410 on rows used for a moving image. At this time, charges accumulated in an accumulation period Tc are stored in the memories 410 on the rows used for a moving image, and charges accumulated in the accumulation period Tb are stored in the memories 410 on the rows used for a still image. The process then advances to step S105.

In step S105, the charges of the first rows that have been accumulated in the accumulation period Tc, and the charges of some second rows (fourth and fifth rows) that have been accumulated in the accumulation period Tb are read out, as represented by frame 2 in FIG. 8. The readout image signals are used to generate a moving image, and are stored in the RAM 108.

By repeating the operations in steps S105 to S108, readout of the image signals of the first rows that have been accumulated in respective accumulation periods, and readout of the image signals of some second rows that have been accumulated in the accumulation period Tb are repeated, as represented by frame 1 to frame 5 in FIG. 8. At the end of readout in frame 5, the image signals of all rows that have been accumulated in the accumulation period Tb have been stored in the RAM 108. After the end of reading out all rows, the image signals which have been accumulated in the accumulation period Tb and stored in the RAM 108 are transferred to the image processing unit 109, and undergo processes such as image correction and compression to generate a still image. The still image is recorded on the external recording medium 113. The signals of moving images of respective frames are processed in the respective frames and recorded as a moving image on the external recording medium 113.

Note that rows used for a still image are read out by every two rows, but the present invention is not limited to this. The number of rows is arbitrary as long as rows can be read out within a frame of a moving image. It is also possible to change the number of rows to be read out when the frame rate of a moving image is changed. Further, a still image is read out after the end of reading out a moving image in a frame, but the readout timing is not limited to this.

If the readout of the image signals of a still image has ended in step S106, the process advances to step S103. If the still image shooting switch has not been pressed in step S103, the process advances to step S109 to determine whether the moving image shooting switch has been pressed. If the moving image shooting switch has not been pressed, the process returns to step S101 to generate and record a moving image by the above-described operation.

If the moving image shooting switch has been pressed in step S107, the process advances to step S111 to read out all the image signals of rows used for a still image that have been stored in the memory 410 and have not been read out yet. The operation shown in FIG. 9C is performed sequentially for second rows which have not been read out, thereby reading out all rows. After the end of reading out all rows, the image signals which have been accumulated in the accumulation period Tb and stored in the RAM 108 are transferred to the image processing unit 109, and undergo processes such as image correction and compression to generate a still image. The still image is recorded on the external recording medium 113. The moving image signals of respective frames are processed in the respective frames and recorded as a moving image on the external recording medium 113. Thereafter, the shooting ends.

If the moving image capturing switch has been pressed in step S109, the process advances to step S110. If the image signals of a still image have been stored in the memory 410, the process advances to step S111 to read out the image signals of rows used for a still image that have not been read out. If the image signals of a still image have not been stored in the memory 410, the shooting ends.

Figure 10:
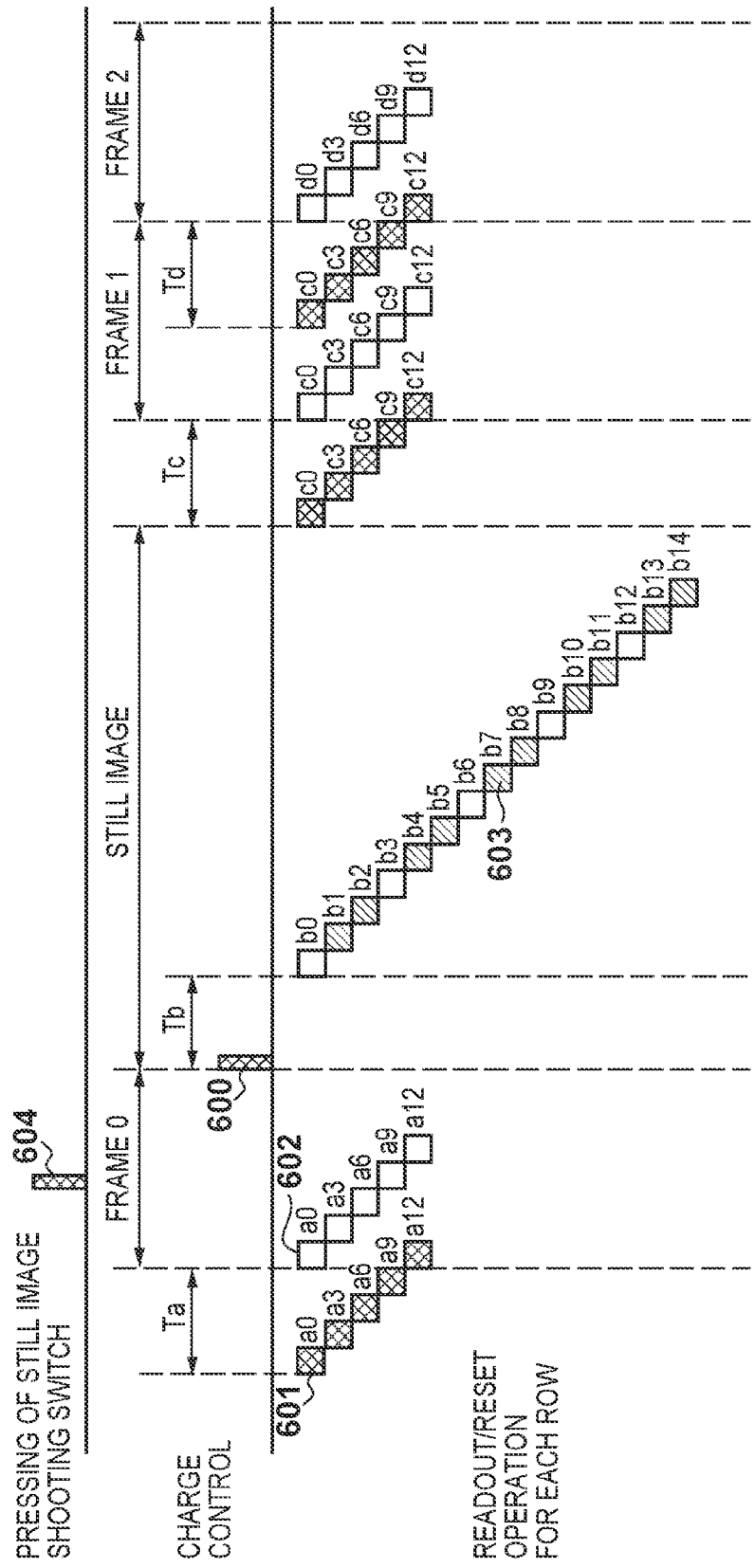
FIG. 10 is a view showing an operation of the image sensor according to the first embodiment of the present invention.

If the still image priority mode has been selected in step S100, the process advances to step S112. In step S112, the image signals of a moving image are read out. FIG. 10 shows a readout operation at this time. In a reset operation 601, the photodiodes 400 on each row are reset.

Figure 11A:
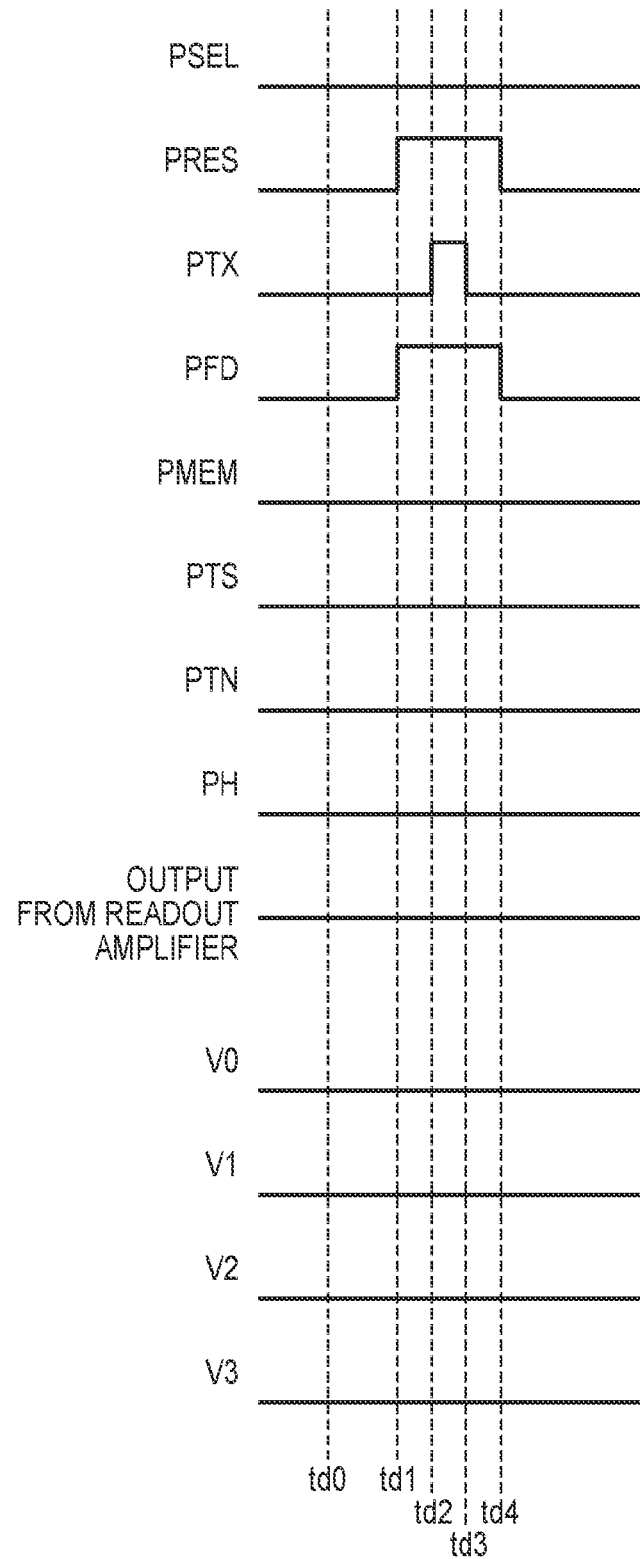
FIG. 11A is a timing chart showing an operation of the image sensor according to the first embodiment of the present invention.

FIG. 11A shows a reset operation for one row. First, at time td0, the control signal PMEM is negated for all rows to turn off the switches 414 and 415, and electrically disconnect the memories 410 from the transfer switches 401 and FDs 407. Then, at time td1, the control signals PRES and PFD become active for a target row to turn on the reset switches 402 and connection switches 408 of all the pixel sets 200, and reset the gates of the pixel amplifiers 406, that is, the FDs 407. In the period between time td2 and time td3, the control signal PTX becomes active for all rows. The charges of the photodiodes 400 of the pixel sets are transferred to the gates of the pixel amplifiers 406 via the transfer switches 401 and connection switches 408. As a result, the photodiodes 400 are reset. When the control signal PTX is negated at time td3, accumulation starts. At time td3, the control signal PRES is negated. In the reset operation 601 shown in FIG. 10, a0 represents reset of the row of row number 0. Here, the rows of row numbers 0, 3, 6, 9, and 12 are sequentially reset.

In a readout operation 602 for one row shown in FIG. 10, an operation shown in FIG. 11B is performed. At time te0, the control signal PSEL becomes active for a readout target row to turn on the row selection switches 405. Each source follower circuit constituted by the pixel amplifier 406 and the current source 203 connected to the vertical output line 201 changes to the operating state. Also, the control signal PFD becomes active to turn on the switches 408 and connect the transfer switches 401 and FDs 407. At time te1, the control signal PRES becomes active to turn on the reset switches 402 and initialize the gates of the pixel amplifiers 406, that is, the FDs 407. That is, signals of a signal level (so-called dark level) immediately after the reset are output to the vertical output lines 201. The control signal PRES is negated at time te2, and the control signal PTN becomes active at time tea. In response to this, the switches 207 connected to the outputs of the column amplifiers 202 connected to the vertical output lines 201 are turned on to hold dark-level outputs in the holding capacitors 209.

Upon completion of the transfer operation at time te4, the control signal PTX becomes active in the period between time te5 and time te6. Then, the charges of the photodiodes 400 are transferred. At this time, the potential varies from the reset level by the amount of signal charges transferred to the source followers constituted by the pixel amplifiers 406, and then the signal level is finalized. At time te1, the control signal PTS becomes active. In response to this, the switches 206 connected to the outputs of the column amplifiers 202 connected to the vertical output lines 201 are turned on, and the holding capacitors 208 hold the signal level. At time te8, the control signal PTS is negated, completing the transfer operation. By these operations, the holding capacitors 208 and 209 hold the signal level and dark level of the pixel sets 200 on the readout target row, respectively. Since the signals have been output from the pixels, the control signal PSEL is negated at time te9. In addition, the control signal PFD is negated to turn off the switches 408, and disconnect the transfer switches 401 and FDs 407.

At time te10, the horizontal scanning circuit 214 outputs the control signal PH to perform an operation of controlling the transfer switches 210 and 211, and connecting the holding capacitors 208 and 209 to the horizontal output lines 212 and 213. The control signal PH(n) becomes active to connect the holding capacitors 208 and 209 on the nth column to the horizontal output lines 212 and 213 via the transfer switches 210 and 211, respectively. That is, a signal accumulated in a pixel positioned on the readout target row and on the nth column is read out to the input of the readout amplifier 215. Then, all the image signals of respective columns such as the (n+1)th column and (n+2)th column are read out. In this fashion, readout of one row is performed by the operation in the period between time te10 and time te11. Note that the readout shown in FIG. 11B is defined as readout in mode 2. As described above, the readout in mode 2 is performed without the mediacy of the memory 410.

In the readout operation 602 for one row shown in FIG. 10, a0 represents readout of the row of row number 0. The time during the reset operation 601 and the readout operation 602 for each row serves as the accumulation period of each row, and sequential accumulation (sequential exposure control) and readout of the rows of row numbers 0, 3, 6, 9, and 12 are repeated to perform readout of one frame. A readout moving image of one frame is transferred to the image processing unit 109, undergoes image correction processing, compression, and the like, and is recorded on the external recording medium 113 as a moving image together with images of subsequent frames.

After the end of reading out a moving image in step S112, the process advances to step S113. In step S113, it is determined whether the still image shooting switch has been pressed. Assume that the still image shooting switch has been pressed at the timing of a flag 604 in FIG. 10. In this case, the process advances to step S114.

In step S114, image signals for a still image are read out. First, at the timing of a reset operation 600 in FIG. 10, the photodiodes 400 on all rows are reset. In the reset operation, the photodiodes 400 are reset by performing the operation shown in FIG. 11A for all rows. Light irradiating the image sensor 101 is cut off by a mechanism (not shown) outside the image sensor 101 during a period till the start of reading out an image signal after the reset. The period until light is cut off serves as the accumulation period. This accumulation period is Tb. After the end of accumulation, the image signals of respective rows are read out. As shown in FIG. 10, readout of the image signals of rows of row numbers 0 to 14 is performed in mode 2 shown in FIG. 11B. After the end of reading out all image signals, the readout image signals are transferred to the image processing unit 109, undergo processes such as image correction and compression, and are recorded as a still image on the external recording medium 113.

After the end of reading out image signals for a still image in step S114, the process advances to step S113. If the still image shooting switch has not been pressed, the process advances to step S115 to determine whether the moving image shooting switch has been pressed. If the moving image shooting switch has been pressed, the shooting ends. If the moving image shooting switch has not been pressed, the process returns to step S112 to continue moving image shooting.

As described above, in the moving image priority mode, the image signals of a still image are divisionally read out through a plurality of frames of a moving image. The still image can be shot without interrupting the moving image.

In the still image priority mode, a moving image is interrupted, then still image shooting is performed, and thus, still images can be continuously shot. Since the memories 410 are not used, some or all of the power supplies of the substrate on which the memories 410 are arranged can be turned off, reducing power.

Second Embodiment

The second embodiment of the present invention will be described below. The arrangement of an image capturing apparatus according to the second embodiment is the same as that in FIG. 1 described in the first embodiment, and a description thereof will not be repeated. The second embodiment is different in the arrangement of a pixel set 200 in an image sensor 101.

Figure 12:
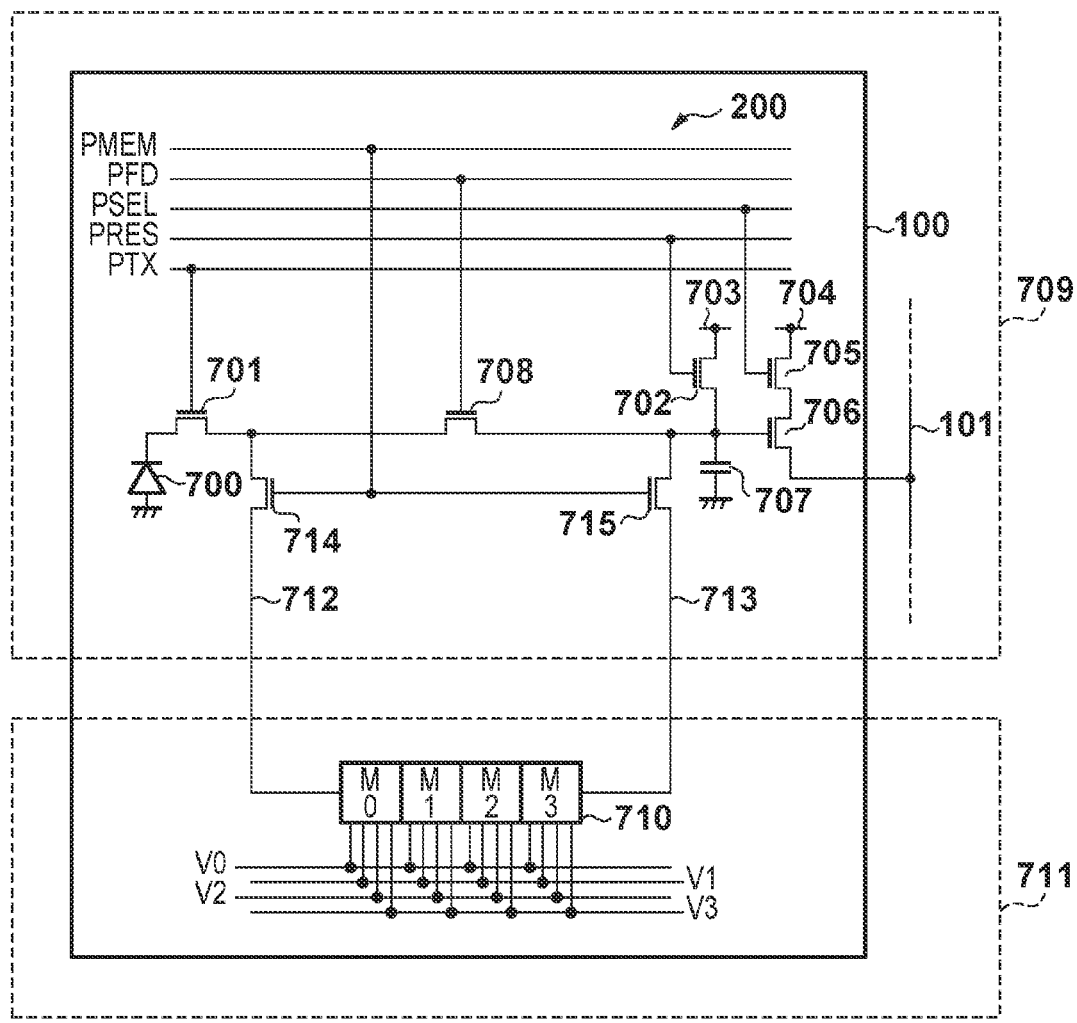
FIG. 12 is a circuit diagram showing the arrangement of a pixel set according to the second embodiment of the present invention.

FIG. 12 shows the arrangement of the pixel set 200 in the image sensor 101 according to the second embodiment. The gate of a transfer switch 701 in the pixel set 200 receives a control signal PTX. The transfer switch 701 is connected to a photodiode 700, and an FD 707 via a connection switch 708. The connection switch 708 receives a control signal PFD. The gate of a reset switch 702 receives a control signal PRES, and the gate of a row selection switch 705 receives a control signal PSEL. A pixel amplifier 706 is connected to the FD 707. Each of the control signals PTX, PFD, PRES, PSEL, and PMEM is equivalent to a control signal to be output to a control signal line 204 in FIG. 2, and is controlled for each row.

A memory group 710 is constituted by connecting four (arranging a plurality of) unit memories for temporarily storing charges accumulated in the photodiode 700. The memory group 710 has one end connected to the transfer switch 701 via a connection line 712 and switch 714, and the other end connected to the FD 707 via a connection line 713 and switch 715. The memory group 710 is constituted by a charge-coupled device, and driving voltages V0, V1, V2, and V3 output to a driving voltage line 219 in FIG. 2 for each row are applied to the respective unit memories. Note that the memory group 710 serving as a storage element is constituted by a charge-coupled device, but is not limited to this. Any element which independently holds a plurality of charges, such as a capacitor, is applicable as the storage element. Also, the number of unit memories is four, but is not limited to this.

As shown in FIG. 4, the image sensor is constituted by joining substrates 300 and 301 serving as two semiconductor substrates. Circuit elements within a broken line 709 in FIG. 12 are formed on the substrate 300. Circuit elements shown in FIG. 1 other than the pixel set 200 are similarly formed on the substrate 300. To the contrary, the memory group 710 within a broken line 711, and a driving circuit (not shown) for the driving voltages V0, V1, V2, and V3 are formed on the substrate 301. The connection lines 712 and 713 are formed from microbumps or the like, and the substrates 300 and 301 are electrically connected for each pixel. With this arrangement, even when the area of the memory group 710 is large, the area of the photodiode 700 need not be decreased, and the image quality including the saturation characteristic and resolution can be maintained.

For example, the image sensor 101 according to the second embodiment is constituted by arraying the pixel sets 200 by 20 pixels in the horizontal direction and 15 pixels in the vertical direction, as shown in FIG. 5. When still image shooting is performed, the image signals of all the pixel sets shown in FIG. 5 are read out to generate a still image. When moving image shooting is performed, the image signals of pixel sets on rows indicated by row numbers 0, 3, 6, 9, and 12 are read out for every frame (thinning readout) to generate a moving image. That is, the image signals of the pixel sets 200 hatched in FIG. 5 are not read out for a moving image. The rows of row numbers 0, 3, 6, 9, and 12 shown in FIG. 5 will be called first rows. The rows hatched in FIG. 5 which are thinned out and are not read out for a moving image will be called second rows. Note that the array of the pixel sets 200, and pixel sets serving as readout targets for a still image or moving image are not limited to this arrangement.

Figure 13A:
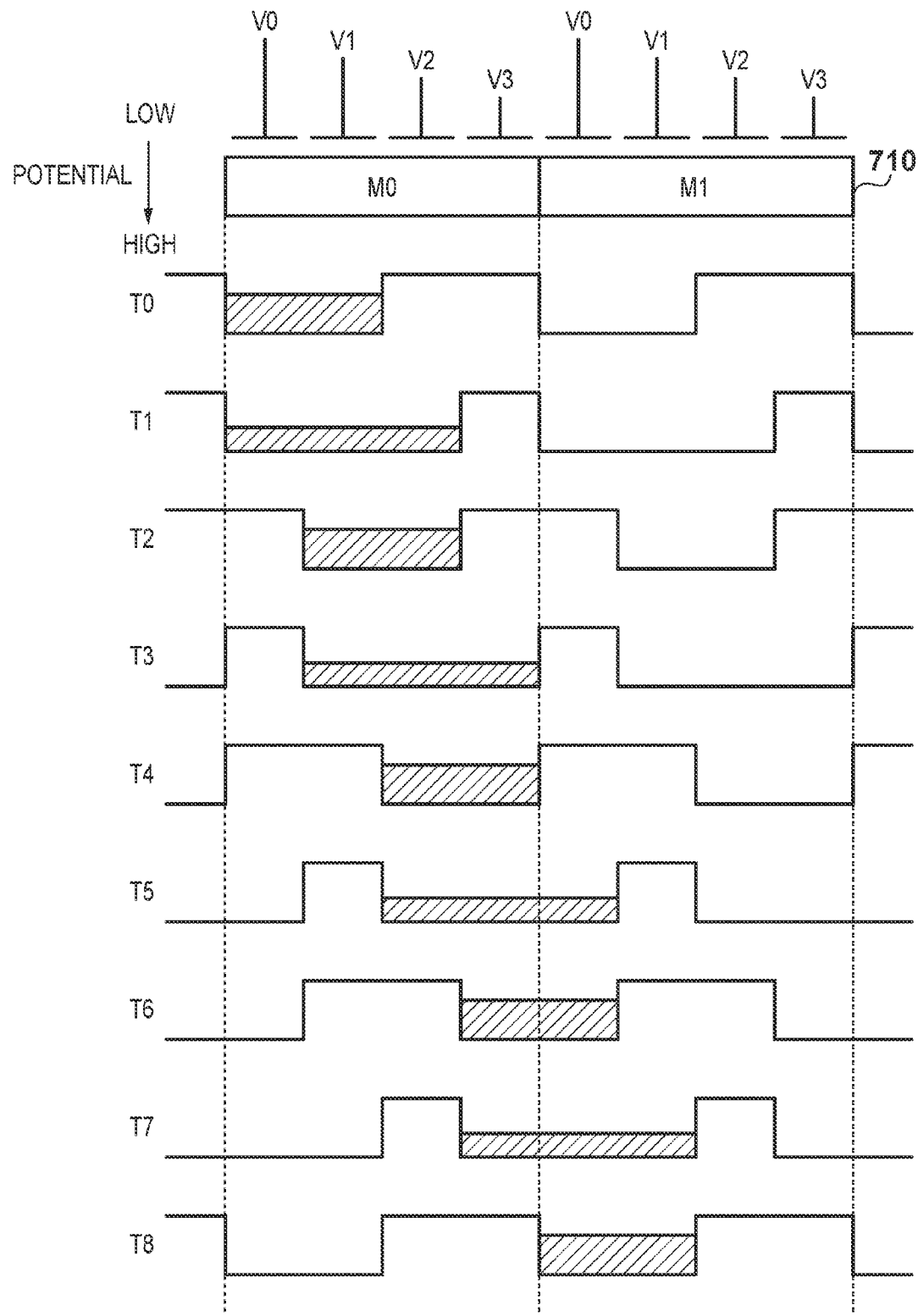
FIG. 13A is a timing chart showing an operation of an image sensor according to the second embodiment of the present invention.
Figure 13B:
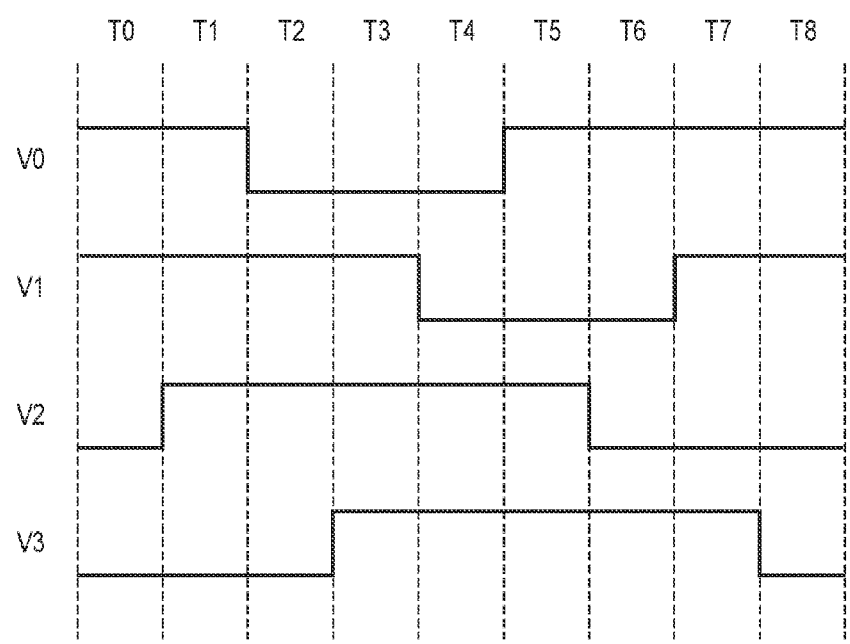
FIG. 13B is a timing chart showing an operation of the image sensor according to the second embodiment of the present invention.

Next, the movement of charges in the memory group 710 will be explained with reference to FIGS. 13A and 13B. As shown in FIG. 13A, the driving voltages V0, V1, V2, and V3 are applied to the respective unit memories. At time T0, the driving voltages V0 and V1 are applied. The potential drops at portions at which the voltages V0 and V1 are applied, and charges are stored there. At time T1, the voltage V2 is applied, and charges spread to a range in which the voltages V0 to V2 are applied. At time T2, the application of the voltage V0 is stopped, and the charges are stored at portions at which the voltages V1 and V2 are applied. As a result, the charges move by one electrode. When the same operation is continued from time T3 to time T8, the charges move by one unit memory, as shown in FIG. 13B. By repeating the operations at time T0 to time T8 three times, charges accumulated three times in the photodiodes 700 can be independently stored in unit memories M(1) to M(3).

FIG. 14 is a flowchart showing the operation of an image capturing apparatus 100 according to the second embodiment. The operation of the image capturing apparatus 100 will be explained with reference to FIG. 14. First, when a moving image shooting switch included in an operation unit 105 is pressed, moving image shooting starts, and the process advances to step S200.

Figure 15:
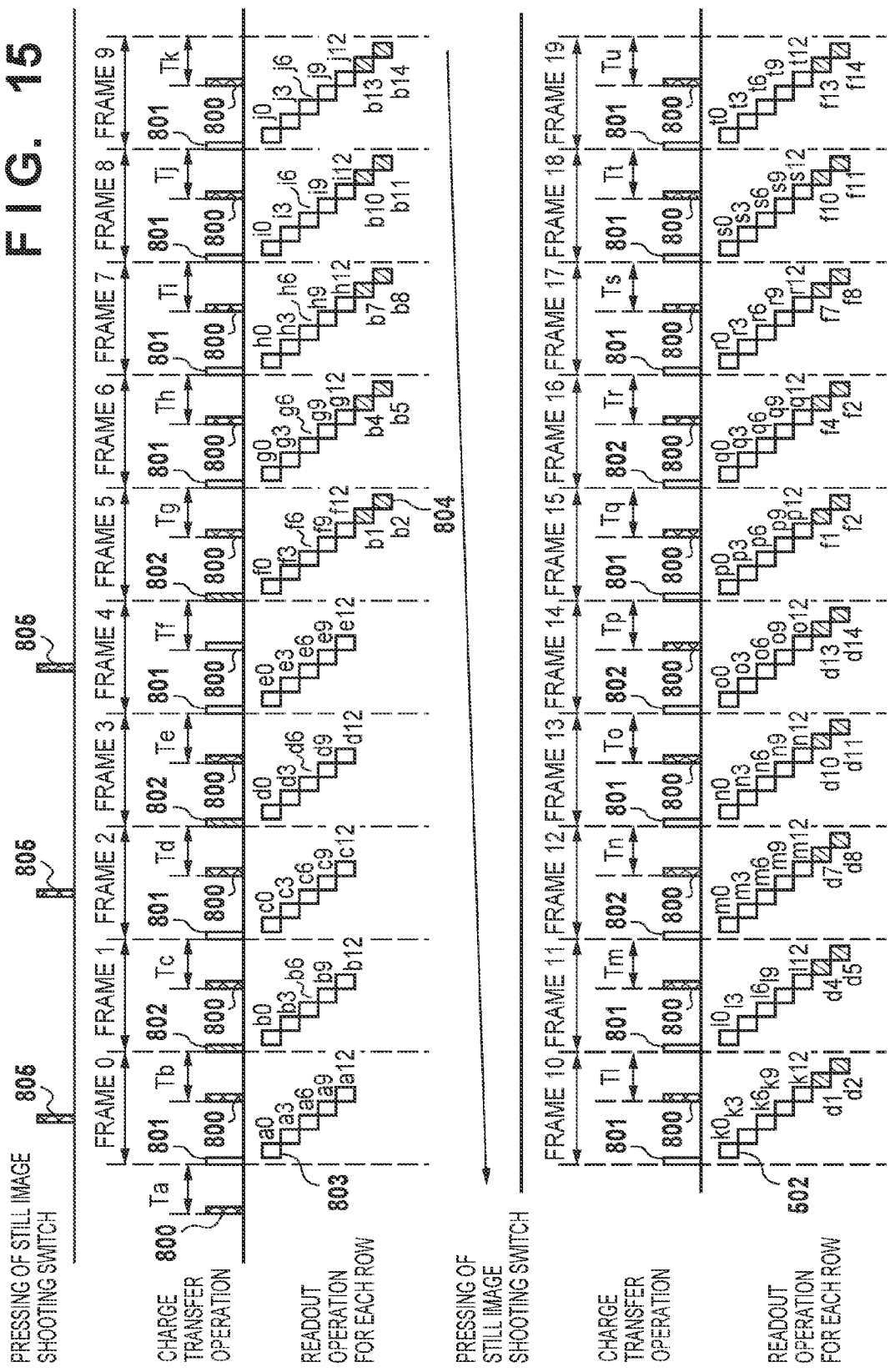
FIG. 15 is a view showing an operation of the image sensor according to the second embodiment of the present invention.

In step S200, charges accumulated in the photodiodes 700 of the pixel sets 200 on the first rows are transferred to the memory groups 710. FIG. 15 is a view showing accumulation of charges, transfer to the memory group, and readout of charges (image signals). In a reset operation 800, the photodiodes 700 of all the pixel sets 200 are reset. The reset operation is the same as the operation in FIG. 9A described in the first embodiment. In a transfer operation 801, charges are transferred from the photodiodes 700 on the first rows to the memory groups 710.

Figure 16A:
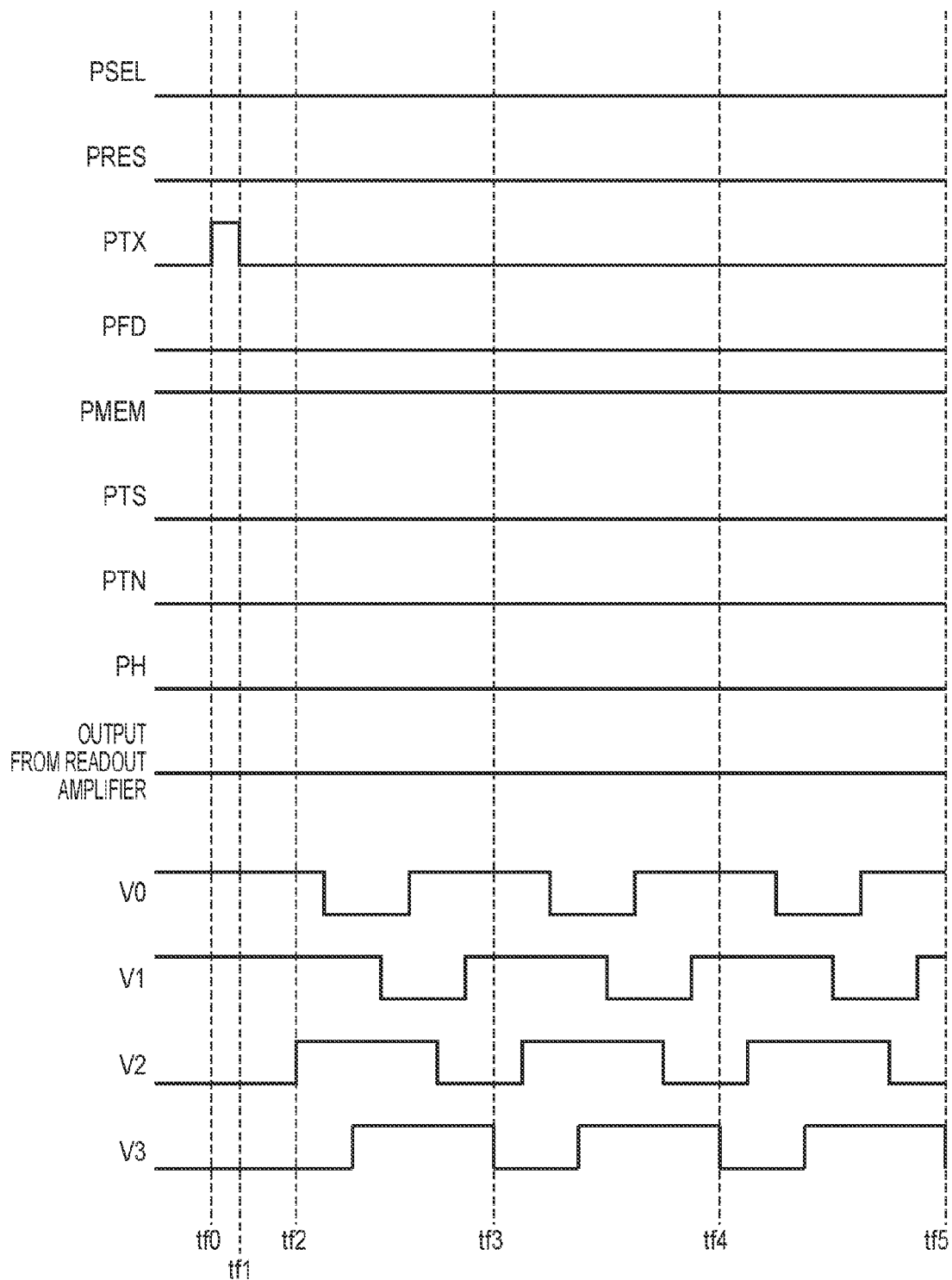
FIG. 16A is a timing chart showing an operation of the image sensor according to the second embodiment of the present invention.

FIG. 16A shows a charge transfer operation. In the period between time tf0 and time tf1, the control signal PTX becomes active for the first rows to turn on the transfer switches 701, and transfer charges accumulated in the photodiodes 700 to the unit memories M(0) of the memory groups 710. The accumulation is completed by this operation, and a period Ta shown in FIG. 15 serves as the accumulation period. In the period between time tf2 and time tf3, the memory groups 710 are driven to apply the driving voltages V0, V1, V2, and V3 at the timings of periods T0 to T8 shown in FIG. 13B for rows used for a moving image. Accordingly, the charges are stored in the unit memories M(1) of the memory groups 710. In the period between time tf3 and tf4, and the period between time tf4 and tf5, the memory groups 710 are driven to apply the driving voltages V0, V1, V2, and V3 at the timings of the periods T0 to T8 shown in FIG. 13B. In response to this, the charges stored in the unit memories M(1) move to the unit memories M(3) via the unit memories M(2). By these operations, image signals (charges) simultaneously generated by exposure are stored in the unit memories M(3) of the memory groups 710 on the first rows in respective pixels.

Thereafter, in step S201, the image signals of a moving image that have been stored in the memory groups 710 are read out. In a readout operation 803 for each row shown in FIG. 15, a0 represents readout of charges (image signals) accumulated in the accumulation period Ta from the row of row number 0. Charges (image signals) accumulated in the accumulation period Ta on the rows of row numbers 0, 3, 6, 9, and 12 are sequentially read out. The image signal readout operation is the same as the operation in FIG. 9C described in the first embodiment. A readout moving image of one frame is transferred to an image processing unit 109, undergoes image correction processing, compression, and the like, and is recorded on an external recording medium 113 as a moving image together with images of subsequent frames.

The process then advances to step S202. In step S202, a CPU 104 determines whether a still image shooting switch has been pressed. In this case, as shown in FIG. 15, it is determined that the still image shooting switch has been pressed during readout of frame 0, a flag 805 is set, and the process advances to step S203.

Figure 16B:
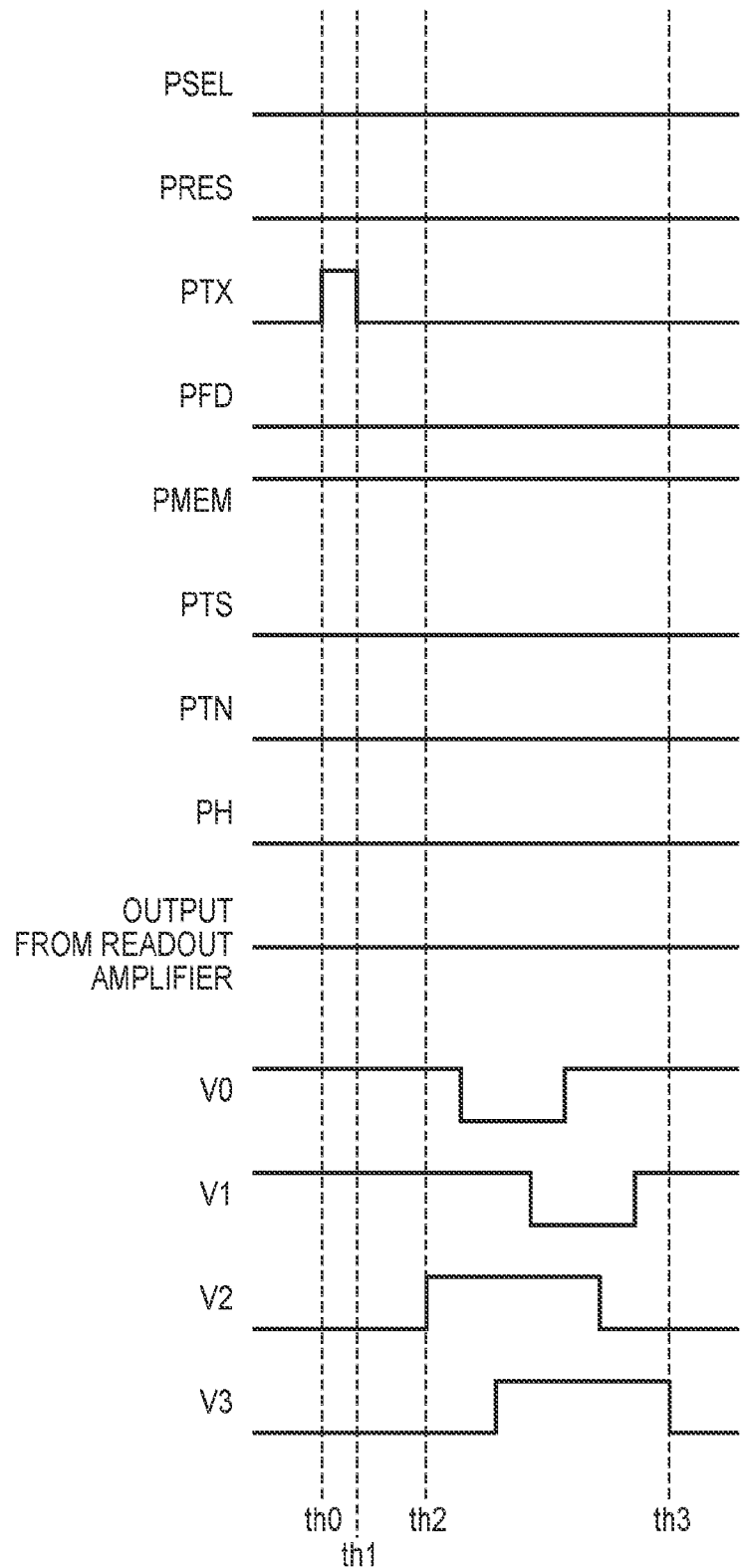
FIG. 16B is a timing chart showing an operation of the image sensor according to the second embodiment of the present invention.

In step S203, charges accumulated in the photodiodes 700 of the pixel sets 200 on the first and second rows are transferred to the memory groups 710. After the photodiodes 700 on all rows are reset by the reset operation 800 shown in FIG. 15, the charges of all the rows that have been accumulated in an accumulation period Tb are transferred by the transfer operation 802. At this time, as for the first rows, transfer is performed by the operation shown in FIG. 16A to transfer charges to the unit memories M(3) of the memory groups 710. As for the second rows, transfer is performed by an operation shown in FIG. 16B. In the period between time th0 and time th1, the control signal PTX becomes active for the first rows to transfer the accumulated charges to the unit memories M(0) of the memory groups 710. The accumulation is completed by this operation, and a period Tb shown in FIG. 15 serves as the accumulation period. In the period between time th2 and time th3, the memory groups 710 are driven to apply the driving voltages V0, V1, V2, and V3 at the timings of the periods T0 to T8 shown in FIG. 13B for the second rows. In response to this, the charges are stored in the unit memories M(1) of the memory groups 710. By these operations, charges accumulated in the accumulation period Tb are stored in the unit memories M(3) for row numbers 0, 3, 6, 9, and 12, and charges accumulated in the accumulation period Tb are stored in the unit memories M(1) for row numbers 1, 2, 4, 5, 7, 8, 10, 11, 13, and 14.

In step S204, it is determined whether charges have been stored in all the unit memories M(1) to M(3) on the second rows. Since charges are not stored in only the unit memories M(2) for the second rows, the process advances to step S201. Steps S201 to S204 are repeated until charges are transferred to all the unit memories M(1) to M(3) on the second rows. When the charges of the second rows are transferred, charges stored in M(1) move to M(2), and charges from the photodiodes 700 are newly stored in M(1).

By repeating the charge transfer of the second rows in this manner, charges move between the unit memories. In the second embodiment, the three unit memories M(1) to M(3) can store charges, so the charge transfer of the second rows is repeated until the still image shooting switch is pressed three times, as shown in FIG. 15. In FIG. 15, the charge transfer of the second rows is performed in accumulation periods Tb, Td, and Tf. As a result, charges in the accumulation period Tf are stored in the unit memories M(1) on the second rows, charges in the accumulation period Td are stored in the unit memories M(2), and charges in the accumulation period Tb are stored in the unit memories M(3). Note that the readout image signals of the first rows sequentially undergo image processing to generate a moving image. However, the image signals of the first rows in the accumulation periods Tb, Td, and Tf in which still image shooting was performed are stored and held in the RAM 108 in order to store them when generating a still image later.

If charges are stored in the unit memories M(1) to M(3) on the second rows in step S204, the process advances to step S205 to read out a still image and moving image. As represented by frame 5 in FIG. 15, readout of the first rows accumulated in the accumulation period Tf is performed by the operation shown in FIG. 9C. Among the second rows accumulated in the accumulation period Tb, the second rows of row numbers 1 and 2 are read out. The readout of the second rows is also performed by the operation shown in FIG. 9C.

In step S206, it is determined whether all charges stored in the unit memories M(1) to M(3) have been read out. Since all charges have not been read out, the process advances to step S207. In step S207, it is determined whether the moving image shooting switch has been pressed again. If the moving image shooting switch has not been pressed, the process advances to step S208. In step S208, transfer of the first rows is performed, and the process returns to step S205.

By repeating the operations in steps S205 to S208 in this fashion, the charges of the second rows that have been accumulated in the accumulation period Tb through frame 5 to frame 9 are read out, as shown in FIG. 15. Similarly, the charges of the second rows that have been accumulated in the accumulation period Td through frame 10 to frame 14, and the charges of the second rows that have been accumulated in the accumulation period Tf through frame 15 to frame 19 are read out.

The readout charges of the second rows are transferred to the RAM 108 and held. When all data are read out, data of the first and second rows in the accumulation period Tb that are stored in the RAM 108 are composed by the image processing unit, and undergo processes such as image correction and compression to generate a still image. The still image is recorded on the external recording medium 113. The same processing is also performed even for images shot in the accumulation periods Td and Tf.

If the readout of a still image has ended in step S206, the process advances to step S202. If the still image shooting switch has not been pressed in step S202, the process advances to step S209 to determine whether the moving image shooting switch has been pressed. If the moving image shooting switch has been pressed, the shooting ends. If the moving image shooting switch has not been pressed in step S209, the process returns to step S200 to perform the above-described processing.

If the moving image shooting switch has been pressed in step S207, the process advances to step S210. In step S210, all charges which have been stored in the unit memories and have not been read out are read out, and then the shooting ends.

By divisionally reading out a still image through a plurality of frame periods of a moving image, as in the above-described operation, the still image can be shot without interrupting the moving image. At this time, a plurality of memories are arranged for each pixel. While moving charges, charges in a plurality of accumulation periods are stored in the plurality of memories, and are read out later. Hence, the next shooting can be performed before the end of reading out one still image. Continuous shooting of still images (a plurality of accumulation control operations) can be performed at a predetermined time interval without interrupting a moving image.

Third Embodiment

Figure 17:
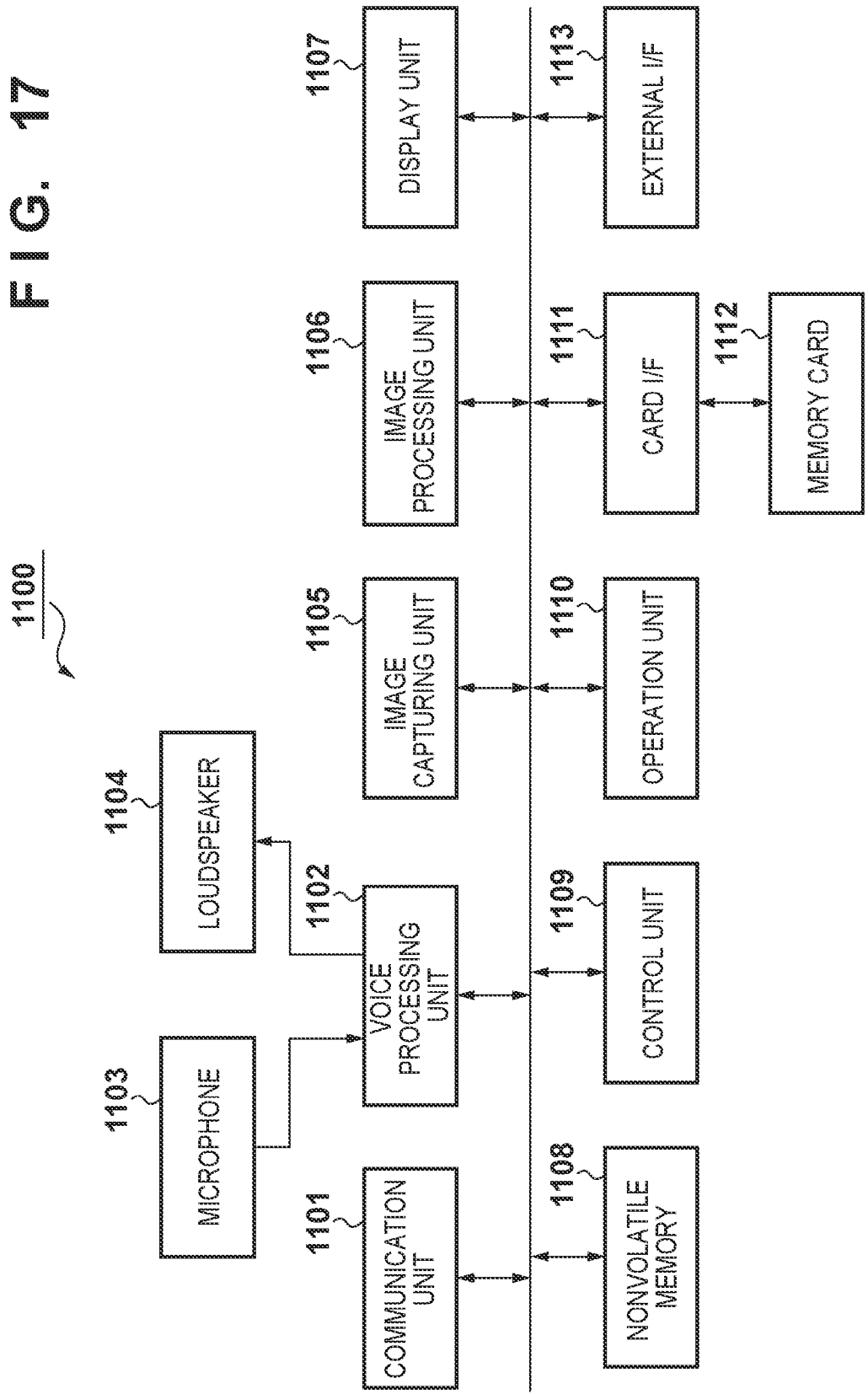
FIG. 17 is a block diagram showing an arrangement according to the third embodiment of the present invention.

FIG. 17 is a block diagram showing the arrangement of a mobile phone 1100 according to the third embodiment of the present invention. The mobile phone 1100 according to the third embodiment has an e-mail function, Internet connection function, image shooting/playback function, and the like, in addition to a voice communication function.

In FIG. 17, a communication unit 1101 communicates voice data and image data with another telephone by a communication method complying with a communication carrier with which the user has a contract. In voice communication, a voice processing unit 1102 converts voice data from a microphone 1103 into a format suited to origination, and sends the converted data to the communication unit 1101. Also, the voice processing unit 1102 decodes voice data from a voice communication partner that has been sent from the communication unit 1101, and sends the decoded data to a loudspeaker 1104. An image capturing unit 1105 shoots an image of an object, and outputs image data. At the time of shooting an image, an image processing unit 1106 processes image data shot by the image capturing unit 1105, converts the data into a format suited for recording, and outputs the converted data. At the time of playing back a recorded image, the image processing unit 1106 processes the played-back image, and sends the processed image to a display unit 1107. The display unit 1107 includes a liquid crystal display panel about several inches in size, and displays various screens in accordance with instructions from a control unit 1109. A nonvolatile memory 1108 stores information of an address book, and data such as data of e-mail, and image data shot by the image capturing unit 1105.

The control unit 1109 includes a CPU and memory, and controls the respective units of the mobile phone 1100 in accordance with a control program stored in the memory (not shown). An operation unit 1110 includes a power button, number keys, and various other operation keys used to input data by the user. A card I/F 1111 records and plays back various data on and from a memory card 1112. An external I/F 1113 transmits, to an external device, data stored in the nonvolatile memory 1108 and memory card 1112, and receives data transmitted from an external device. The external I/F 1113 performs communication by a well-known communication method such as a wired communication method (for example, USB) or wireless communication.

Next, the voice communication function in the mobile phone 1100 will be explained. When calling a voice communication partner, the user operates the number keys of the operation unit 1110 to input the number of the voice communication partner, or displays, on the display unit 1107, an address book stored in the nonvolatile memory 1108, selects the voice communication partner, and designates origination. When the origination is designated, the control unit 1109 originates a call to the voice communication partner via the communication unit 1101. If the voice communication partner answers the call, the communication unit 1101 outputs voice data of the partner to the voice processing unit 1102, and in addition, transmits voice data of the user to the partner.

When sending e-mail, the user designates creation of mail by using the operation unit 1110. When the creation of mail is designated, the control unit 1109 displays a mail creation screen on the display unit 1107. The user inputs a destination address and body by using the operation unit 1110, and designates sending. If sending of the mail is designated, the control unit 1109 sends address information and data of the mail body to the communication unit 1101. The communication unit 1101 converts the mail data into a format suited to communication, and sends it to the destination. If the communication unit 1101 receives e-mail, it converts the received mail data into a format suited for display, and displays it on the display unit 1107.

Next, the shooting function in the mobile phone 1100 will be explained. When the user operates the operation unit 1110 to set the shooting mode and then designate shooting of a still image or moving image, the image capturing unit 1105 shoots still image data or moving image data, and sends it to the image processing unit 1106. The image processing unit 1106 processes the shot still image data or moving image data, and stores the processed data in the nonvolatile memory 1108. The image processing unit 1106 sends the shot still image data or moving image data to the card I/F 1111. The card I/F 1111 stores the still image data or moving image data in the memory card 1112.

The mobile phone 1100 can transmit, as a file attached to e-mail, a file including a still image or moving image data shot in this manner. More specifically, when transmitting e-mail, an image file stored in the nonvolatile memory 1108 or memory card 1112 is selected, and transmission of the image file as an attached file is designated.

The mobile phone 1100 can also transmit a file including a shot still image or moving image data to an external device such as a PC or another telephone via the external I/F 1113. The user operates the operation unit 1110 to select an image file stored in the nonvolatile memory 1108 or memory card 1112, and designate transmission. The control unit 1109 controls the external I/F 1113 to read out the selected image file from the nonvolatile memory 1108 or memory card 1112, and transmit it to the external device.

Preferred embodiments of the present invention have been described above. However, the present invention is not limited to these embodiments, and can be variously modified and changed without departing from the spirit of the invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-211429, filed Oct. 8, 2013, which is hereby incorporated by reference herein in its entirety.

What is claimed is:

1. An image sensor n which a first semiconductor substrate and a second semiconductor substrate are stacked with each other, comprising:
   a plurality of photoelectric conversion portions each of which generates a pixel signal;
   a plurality of signal holding portions each of which temporarily holds the pixel signal;
   a plurality of signal output portions each of which outputs the pixel signal;
   a plurality of first switches each of which transfers the pixel signal from h of the plurality of photoelectric conversion portions which are arranged on the first semiconductor substrate to each of the plurality of signal holding portions which are arranged on the second semiconductor substrate; and
   a plurality of second switches each of which transfers the pixel signal from each of the plurality of signal holding portions which are arranged on the second semiconductor substrate to each of the plurality of signal output portions which are arranged on the first semiconductor substrate,
   wherein each of the plurality of signal holding portions are arranged with respect to each of the plurality of photoelectric conversion portions.

2. The image sensor according to claim 1, wherein each of the plurality of signal holding portions is formed by a charge coupled device.

3. The image sensor according to claim 1, wherein each of the signal holding portions is formed by a plurality of signal holding devices.

4. The image sensor according to claim 1, wherein the first switch and the second switch are arranged on the first semiconductor substrate.

5. An image capturing apparatus comprising:
   an image sensor in which a first semiconductor substrate and a second semiconductor substrate are stacked with each other, comprising:
   a plurality of photoelectric conversion portions each of which generates a pixel signal,
   a plurality of signal holding portions each of which temporarily holds the pixel signal,
   a plurality of signal output portions each of which outputs the pixel signal,
   a plurality of first switches each of which transfers the pixel signal from each of the plurality of photoelectric conversion portions which are arranged on the first semiconductor substrate to each of the plurality of signal holding portions which are arranged on the second semiconductor substrate, and
   a plurality of second switches each of which transfers the pixel signal from each of the plurality of signal holding portions which are arranged on the second semiconductor substrate to each of the plurality of signal output portions which are arranged on the first semiconductor substrate,
   wherein each of the of signal holding portions are arranged with respect to each of the plurality of photoelectric conversion portions;
   an image processing unit which applies a predetermined image processing to an image signal output from the image sensor; and
   a controller which controls operations of the image sensor and the image processing unit.

6. The apparatus according to claim 5, wherein each of the plurality of signal holding portions is formed by a charge coupled device.

7. The apparatus according to claim 5, wherein each of the plurality of signal holding portions is formed by a plurality of signal holding devices.

8. The apparatus according to claim 5, wherein the first switch and the second switch are arranged on the first semiconductor substrate.

9. A mobile phone comprising:
   an image sensor in which a first semiconductor substrate and a second semiconductor substrate are stacked with each other, comprising:
   a plurality of photoelectric conversion portions each of which generates a pixel signal,
   a plurality of signal holding portions each of which temporarily holds the pixel signal,
   a plurality of signal output portions each of which outputs the pixel signal,
   a plurality of first switches each of which transfers the pixel signal from each of the plurality of photoelectric conversion portions which are arranged on the first semiconductor substrate to each of the plurality of signal holding portions which are arranged on the second semiconductor substrate, and
   a plurality of second switches each of which transfers the pixel signal from each of the plurality of signal holding portions which are arranged on the second semiconductor substrate to each of the plurality of signal output portions which are arranged on the first semiconductor substrate, wherein each of the plurality of signal holding portions are arranged with respect to each of the plurality of photoelectric conversion portions;

an image processing unit which applies a predetermined image processing to an image signal output from the image sensor;

a voice communication unit which performs a voice communication; and a controller which controls operations of the image sensor, the image processing unit and the voice communication unit.

10. The mobile phone according to claim 9, wherein each of the plurality of signal holding portions is formed by a charge coupled device.

11. The mobile phone according to claim 9, wherein each of the plurality of signal holding portions is formed by a plurality of signal holding devices.

12. The mobile phone according to claim 9, wherein the first switch and the second switch are arranged on the first semiconductor substrate.

13. The image sensor according to claim 1, wherein each of the plurality of signal output portions includes a floating diffusion portion and a pixel amplifier.

14. The image capturing apparatus according to claim 5, wherein each of the plurality of signal output portions includes a floating diffusion portion and a pixel amplifier.

15. The mobile phone according to claim 9, wherein each of the plurality of signal output portions includes a floating diffusion portion and a pixel amplifier.

* * * * *